US008580863B2

(12) United States Patent
Shibaya et al.

(10) Patent No.: US 8,580,863 B2
(45) Date of Patent: Nov. 12, 2013

(54) SOFT FOAM, MOLDED PRODUCT, AND SHOCK ABSORBER COMPRISING THE MOLDED PRODUCT

(75) Inventors: Miaki Shibaya, Settsu (JP); Masaoki Gotou, Settsu (JP); Mitsunaga Noda, Settsu (JP); Masami Kawakami, Settsu (JP)

(73) Assignee: Kaneka Corporation, Osaka (JP)

( * ) Notice: Subject to any disclaimer, the term of this patent is extended or adjusted under 35 U.S.C. 154(b) by 774 days.

(21) Appl. No.: 12/532,581

(22) PCT Filed: Mar. 21, 2008

(86) PCT No.: PCT/JP2008/055209
§ 371 (c)(1),
(2), (4) Date: Apr. 2, 2010

(87) PCT Pub. No.: WO2008/117734
PCT Pub. Date: Oct. 2, 2008

(65) Prior Publication Data
US 2010/0192289 A1     Aug. 5, 2010

(30) Foreign Application Priority Data

| Mar. 23, 2007 | (JP) | 2007-077590 |
| Jun. 21, 2007 | (JP) | 2007-164235 |
| Aug. 30, 2007 | (JP) | 2007-224223 |
| Sep. 19, 2007 | (JP) | 2007-242554 |
| Nov. 29, 2007 | (JP) | 2007-309319 |
| Mar. 11, 2008 | (JP) | 2008-060973 |
| Mar. 11, 2008 | (JP) | 2008-060974 |
| Mar. 11, 2008 | (JP) | 2008-060975 |
| Mar. 11, 2008 | (JP) | 2008-060976 |
| Mar. 11, 2008 | (JP) | 2008-060977 |

(51) Int. Cl.
*C08J 9/00* (2006.01)
*C08J 9/02* (2006.01)
*C08G 77/00* (2006.01)
*C08G 77/02* (2006.01)
*C08G 77/38* (2006.01)

(52) U.S. Cl.
USPC .................. 521/86; 521/154; 521/88

(58) Field of Classification Search
USPC .............................. 521/154, 86, 88
See application file for complete search history.

(56) References Cited

U.S. PATENT DOCUMENTS

| 4,462,115 A | 7/1984 | Carlson et al. | |
| 5,090,249 A | 2/1992 | Bielewicz | |
| 5,153,231 A * | 10/1992 | Bouquet et al. | 521/88 |
| 5,225,452 A * | 7/1993 | Colas et al. | 521/124 |
| 5,652,276 A * | 7/1997 | Ando et al. | 521/88 |
| 7,826,113 B2 | 11/2010 | Noda | |
| 2008/0239422 A1 | 10/2008 | Noda | |

FOREIGN PATENT DOCUMENTS

| JP | 1-247433 A | 10/1989 |
| JP | 07-196836 A | 8/1995 |
| JP | 7-205357 A | 8/1995 |
| JP | 96-015194 * | 5/1996 |
| JP | 8-267612 A | 10/1996 |
| JP | 9-508824 A | 9/1997 |
| JP | 10-087995 A | 4/1998 |
| JP | 2000-026647 A | 1/2000 |
| JP | 2000-327821 A | 11/2000 |
| JP | 2000-351863 A | 12/2000 |
| JP | 2001-123311 A | 5/2001 |
| JP | 2001-329093 A | 11/2001 |
| JP | 2004-115756 A | 4/2004 |
| JP | 2004-306791 A | 11/2004 |
| JP | 2004-358137 A | 12/2004 |
| JP | 2006-131754 A | 5/2006 |
| JP | 2006-336163 A | 12/2006 |
| JP | 2007-083902 A | 4/2007 |
| WO | 2006/022085 A1 | 3/2006 |

OTHER PUBLICATIONS

J.B. Lauritzen, et al., "Prevention of Bone Fracture in Falling by Hip Protector", Osteoporosis Japan, 2002, pp. 149-157, vol. 10, No. 2.

X. G. Cheng et al., "Assessment of the Strength of Proximal Femur in Vitro: Relationship to Femoral Bone Mineral Density and Femoral Geometry", Bone, Mar. 1997, pp. 213-218, vol. 20, No. 3.

(Continued)

*Primary Examiner* — Randy Gulakowski
*Assistant Examiner* — Kara Boyle
(74) *Attorney, Agent, or Firm* — Westerman, Hattori, Daniels & Adrian, LLP

(57) ABSTRACT

To provide a foam-molded product which is light-weight and superior in formability, flexibility and shock absorbing capacity, and which exhibits favorable tactile impression and excellent safety, as well as a shock absorber using the same that provides favorable feel in wearing.

Means for Resolution: When a foam-molded product is used which is produced by including foamed resin particles in a soft resin obtained from a silicone based polymer, as a base resin, produced by curing a liquid resin composition including: (A) a curing agent having at least two hydrosilyl groups in the molecular chain; (B) a polymer which has at least one alkenyl group in the molecular chain, comprises a saturated hydrocarbon unit or an oxyalkylene unit as a repeating unit that constitutes the main chain, and is a linear polymer having a number average molecular weight of no lower than 10,000; and (C) a hydrosilylation catalyst, the product can be suitably used in garments to which it is attached as a shock absorber at an appropriate site such as the front body, the flank part, the back body and the hip around the lumbar.

13 Claims, 1 Drawing Sheet

(56) References Cited

OTHER PUBLICATIONS

A. Harada, "Prevention of Elderly Persons from Bone Fracture in Falling", Japan Medical Association Journal, 1999, pp. 1955-1959, vol. 122, No. 13.

A. Harada et al, "Utility of Hip Protector in Bone Fracture in the Vicinity of Femur", Joint Surgery, 2004, pp. 1548-1554, vol. 23, No. 12.

H. Okuizumi et al., "Effect on the Femur of a New Hip Fracture Preventive System Using Dropped-Weight Impact Testing" Journal of Bone and Mineral Research, 1998, pp. 1940-1945, vol. 13, No. 12.

International Search Report of PCT/JP2008/055209, date of mailing Jun. 3, 3008.

Database WPI Week 200233 Thomson Scientific, London, GB, AN 2002-286055, XP000002655246, & JP 2001 329093 A (Tokai Rubber Ind Ltd) Nov. 27, 2001. (Supplementary European Search Report dated Aug. 18, 2011).

Database WPI Week 2000618 Thomson Scientific, London, GB, AN 2006-174209, XP000002655290, & WO2006-022085 Ai (Nippon SIGMAX Co TD) Mar. 2, 2006. (European Search Report dated Aug. 16, 2011).

Database WPI Week 200707 Thomson Scientific, London, GB, AN 2007-064964, XP000002655289, & JP 2006 336163 A (Shigeru KK) Dec. 14, 2006. (European Search Report dated Aug. 16, 2011).

European Search Report dated Aug. 16, 2011, issued in corresponding European Patent Application No. 091738807.

Supplementary European Search Report dated Aug. 18, 2011, issued in corresponding European Patent Application No. 08722573.6.

\* cited by examiner

SOFT FOAM, MOLDED PRODUCT, AND SHOCK ABSORBER COMPRISING THE MOLDED PRODUCT

TECHNICAL FIELD

The present invention relates to a foam comprising a particular silicone based polymer as a base resin; a foam-molded product composed of a foam comprising a silicone based polymer, and foamed resin particles; a molded product composed of soft resin typified by a silicone based resin, and foamed resin particles; and a shock absorber produced using the same. In addition, the present invention relates to a shock absorbing pad which can be used for the purpose of preventing from occurrence of bone fracture upon falling, in particular, bone fracture that may occur when a patient falls who are suffering from osteoporosis etc. by attaching the pad to an appropriate site which corresponds to around the lumbar, of garments such as underwears, and also relates to garments to which the pad is attached, particularly garments such as pants.

BACKGROUND ART

As foams of polymer compounds, foams produced using a thermoplastic resin such as polystyrene, polyethylene, polypropylene or polyvinyl chloride have been utilized in the form of beads, sheets, or boards, in the civil engineering and construction field, packaging field, electric appliance field, automobile field and the like, taking advantages of their characteristics such as thermal insulation properties, light-weight properties, and shock-absorbing properties. Any of these requires a facility on a large scale for providing their molded products. Additionally, these are often hard foams, in general.

Furthermore, as foams produced using a thermosetting resin by curing and expanding a liquid resin composition, polyurethane foams have been well known. The polyurethane foams can be molded simply with a facility on a small scale, and soft foams can be also produced (Patent Document 1). In addition, both hard and soft foams can comprise polyurethane, which achieves superior formability, and one type of such foams has been known as a low-resilience foam (for example, Patent Document 2). Moreover, for example, polyurethane foams being soft and having a high expansion rate also exhibit comfortable feel in wearing, and have been used by providing in garments as a protector (soft pad) for the purpose of preventing occurrence of wounds, and impacts against the body during playing sports.

However, they are disadvantageous in that isocyanate about which toxicity is concerned must be used. Furthermore, when a great impact load is imparted particularly, for example, such as in the event of a fall, a so-called "bottomed" state may be inevitable, whereby a problem of failing to sufficiently absorbing the impact can be caused. On the other hand, a hard pad is also used for the same purpose, but problems of inferior breathability and bad feel in wearing may be caused, although superior shock absorbing capacity can be achieved. Accordingly, a foam produced without using a material about which toxicity is concerned, which can be easily molded, and which is flexible and exhibits a favorable tactile impression has been demanded.

Low-resilience foams, generally referred to, reportedly have resilient modulus being no greater than 15 to 20%, in general. However, according to the measurement of the resilient modulus, the intensity of bound can be determined, but the slowness of the recovery of the sample cannot be evaluated. It is believed that when a person touches a sample, in a strict sense, not one having low resilient modulus, but one achieving retarded recovery with respect to the deformation is recognized as exhibiting low resilience. However, any procedure for evaluating the slowness of the recovery has not been found so far.

Foams comprising a silicone based polymer are disclosed in, for example, Patent Documents 3 to 5. Patent Document 2 discloses a composition for rollers including: a curing agent having at least two hydrosilyl groups in the molecular chain; a polymer having at least one alkenyl group in the molecular chain and comprising a saturated hydrocarbon unit or an oxyalkylene unit as a repeating unit that constitutes the main chain; a hydrosilylation catalyst; and a foamed elastic layer containing a substance that imparts electric conductivity. However, with respect to the polymer having at least one alkenyl group in the molecular chain and comprising a saturated hydrocarbon unit or an oxyalkylene unit as a repeating unit that constitutes the main chain, a substantially disclosed example is merely use of a polymer having a number average molecular weight of 8,000, and the resulting foam has a hardness, which is determined in terms of ASKER C hardness, to be hardly estimated as being sufficiently soft.

Patent Document 4 discloses a foamable resin composition including: an organic compound having a carbon-carbon double bond and not including a siloxane unit in the molecular skeleton; a compound having SiH having a specific chemical structure; and a compound having an OH group, and a silicone based polymer foam which can be any of from hard to soft obtained from the foamable resin composition. However, the hardness of the soft silicone based polymer is not disclosed, and a suitable formulation for producing a foam having a desired hardness, in particular, as to which polymer having at least one alkenyl group in the molecular chain and comprising a saturated hydrocarbon unit or an oxyalkylene unit as a repeating unit that constitutes the main chain may be specifically used is neither described nor suggested. Although Patent Document 3 discloses a silicone based foamable resin composition, disclosed is to obtain a foam without using a foaming agent.

In addition, as a foam having superior formability and safety, a foamable resin composition including essential components of: a compound having a carbon-carbon double bond; a compound containing at least 1.1 or more Si—H groups per molecule on average; and resin particles containing a foaming agent has been investigated (for example, Patent Document 6).

However, according to this technique, in curing and expanding the foamable resin composition, utilization of the heat generated by an addition reaction between the compound having a carbon-carbon double bond and the compound having Si—H groups makes the basis. Thus, sufficient caloric amount of heat for expansion of the resin particles containing a foaming agent may not be attained in some cases, and a silicone based resin added as a base resin is not expanded; therefore, only a low expansion rate foam of about 5 to 10 times can be achieved, consequently. Moreover, also due to failure in expansion of the base resin, the flexibility and the feel in wearing have been still unsatisfactory.

Under such circumstances, a foam having a high expansion ratio, being superior in flexibility as well as feel in wearing and shock absorbing capacity, and produced without using a material about which toxicity is concerned has been demanded. The reason for such demands is that such a foam can be utilized as a shock absorbing pad for the purpose of preventing occurrence of wounds and impacts against the body during playing sports, and also for the purpose of preventing transcervical fracture in elderly persons.

On the other hand, as elderly population increases in recent years, a concept referred to as "minimization of care needs" to prevent persons from becoming bedridden has been adopted. This is an idea of preventing the state in need of nursing care. As one trigger for lapsing of an elderly person into the state in need of nursing care, bone fracture, particularly transcervical fracture, resulting from falling may be exemplified. Among the bone fracture in elderly persons resulting from falling, particularly the transcervical fracture has been known to account for the basis of the bedridden state (for example, Nonpatent Document 1).

Occurrence of the bone fracture in the vicinity of femur involves two factors, i.e., bone strength and the external force in falling, and the bone strength of young adults beyond the external force in falling decreases to almost half of the external force in falling in the senile stage, which decrease becoming the factor of increase of the bone fracture of the elderly persons (for example, Nonpatent Document 2). It is experimentally ascertained that when the external force beyond the bone strength is applied in falling to the lateral portion of the femoral neck, the femoral fracture is caused at a high rate. Thus, it is suggested that the risk of the bone fracture can be decreased through reduction of the external force that is propagated to the bone when a material for diffusing and absorbing the external force is placed at a greater trochanter part of the femur (for example, Nonpatent Document 3).

Specifically, it was reported that bone fracture of the femoral neck of young adults occurs at 7,200 N, while the strength of the femoral neck of elderly persons has decreased to as low as approximately 2,100 to 3,100 N (for example, Nonpatent Document 4). Since the load applied to the greater trochanter part in falling from standing position is about 5,600 N, bone fracture is inevitable in the range of the bone strengths of elderly persons. Accordingly, it has been accepted that the idea of attaching an external force attenuation device at a greater trochanter part is rational and practically applicable (for example, Nonpatent Document 5).

As similar techniques hitherto, garments provided with a protector at each site for the purpose of preventing occurrence of wounds, and impacts against the body during playing sports have been found. However, such garments to which a protector is directly attached at each site may be suitable for use in sports, but they are not suited as garments for daily use in terms of appearance and comfort in wearing, and the like.

In addition, garments with a shock absorbing pad have been also developed in an attempt to prevent transcervical fracture in elderly persons. Conventional garments with a shock absorbing pad are generally classified into those in which a hard pad is used, and those in which a soft pad is used. The hard pads are of external force-diffusing type, and attenuation of the external force is achieved by elasticity inherent to the material, and also by increasing the area to which the external force is applied (for example, Patent Document 7).

When a hard pad is used, there arise problems of inferior breathability and unpleasant feel in wearing, although the shock absorbing capacity is superior. Although constant wearing is required for sufficiently achieving the effect of preventing the bone fracture, the garments may be taken off intentionally or involuntarily, for example, in bedtime and the like, when an unpleasant feel in wearing is experienced as in the case of hard pads, and falling during such a time period is likely to result in bone fracture.

On the other hand, the soft pad is of external force-absorbing type, and the external force is thermally converted upon deformation of the material, whereby the external force attenuation is achieved. In the case of the soft pads, favorable feel in wearing is enabled, although many of them are inferior in the shock absorbing capacity. Although a polyurethane foam has been predominantly used for soft pads hitherto (for example, Patent Document 8), polyurethane is not adequate for laundering since it has hydrolyzability, and the odor of the remaining reaction catalyst, and the toxicity of unreacted isocyanate are concerned.

Patent Document 1: JP-A No. 2006-131754
Patent Document 2: JP-A No. 2004-358137
Patent Document 3: JP-A No. Hei 8-267612
Patent Document 4: JP-A No. Hei 10-87995
Patent Document 5: JP-A No. 2000-351863
Patent Document 6: JP-A No. Hei 7-196836
Patent Document 7: JP-T (Japanese Translation of PCT International Publication) No. Hei 9-508824
Patent Document 8: JP-A No. 2001-123311
Nonpatent Document 1: Lauritzen J B, Yasushi HAYASHI, Hajime ORIMO: Prevention of bone fracture in falling by hip protector. Osteoporosis Japan, 10: 149-157, 2002.
Nonpatent Document 2: Atsushi HARADA: Prevention of elderly persons from bone fracture in falling. Japan Medical Association Journal, 122: 1955-1959, 1999.
Nonpatent Document 3: Okuizumi H., Harada A., Iwata H., et al: Effect on the femur of a new hip fracture preventive system using dropped-weight impact testing. J Bone Miner Res, 13: 1940-1945; 1998.
Nonpatent Document 4: Cheng X., Lowet G., Boonen S., et al: Assessment of the strength of proximal femur in vitro: Relationship to femoral bone mineral density and femoral geometry., Bone, 20: 213-218; 1997
Nonpatent Document 5: Atsushi HARADA, Hiroyasu OKUIZUMI: Utility of Hip Protector in Bone Fracture in the Vicinity o Femur. Joint Surgery, 23: 1548-1554, 2004.

DISCLOSURE OF THE INVENTION

Problems to be Solved by the Invention

An object of the present invention is to provide a molded product having a low density and being superior in flexibility and shock absorbing capacity, and a shock absorber using the same that permits a superior feel in wearing as well as garments to which the same is attached.

Means for Solving the Problems

The present inventors elaborately investigated in order to solve the foregoing problems, and consequently found that a foam of a silicone based polymer has flexibility, and exhibits favorable tactile impression. In particular, it was found that a silicone based polymer foam produced by curing a foamable resin composition including: a curing agent having at least two hydrosilyl groups in the molecular chain; a polymer having a certain molecular weight, having at least one alkenyl group in the molecular chain and comprising a saturated hydrocarbon unit or an oxyalkylene unit as a repeating unit that constitutes the main chain; a hydrosilylation catalyst; and a foaming agent is flexible, and exhibits favorable tactile impression.

In addition, it was found that a molded product comprising a soft resin typified by a silicone based resin including foamed resin particles, a soft foam, particularly a silicone based soft resin foam, including foamed resin particles is superior in formability, flexibility and shock absorbing capacity, and exhibits favorable tactile impression and excellent safety.

It was found that a shock absorbing pad which is superior in shock absorbing capacity and exhibits favorable feel in wearing, accompanied by less toxicity is obtained by using as a material of a shock absorbing pad a foam comprising a silicone based polymer as a base resin, and that garments to which the shock absorbing pad is attached exhibit favorable feel in wearing. Accordingly, the present invention was accomplished.

More specifically, aspects of the present invention are as in the following.

A first aspect provided by the present invention is a foam comprising a silicone based polymer as a base resin.

A second aspect is the silicone based polymer foam according to the first aspect which is produced by curing a foamable resin composition including: (a) a curing agent having at least two hydrosilyl groups in the molecular chain; (b) a polymer having at least one alkenyl group in the molecular chain and comprising a saturated hydrocarbon unit or an oxyalkylene unit as a repeating unit that constitutes the main chain; (C) a hydrosilylation catalyst; and (D) a foaming agent.

A third aspect is the silicone based polymer foam according to the second aspect in which the polymer (b) having at least one alkenyl group in the molecular chain and comprising a saturated hydrocarbon unit or an oxyalkylene unit as a repeating unit that constitutes the main chain is a linear polymer having a number average molecular weight of no lower than 10,000.

A fourth aspect is the silicone based polymer foam according to the second aspect in which the polymer (b) having at least one alkenyl group in the molecular chain and comprising a saturated hydrocarbon unit or an oxyalkylene unit as a repeating unit that constitutes the main chain is a linear polymer having a number average molecular weight of no lower than 15,000.

A fifth aspect is the silicone based polymer foam according to any one of the second to fourth aspects in which the repeating unit that constitutes the main chain of the polymer (b) is an oxypropylene unit.

A sixth aspect is the silicone based polymer foam according to any one of the second to fifth aspects in which the molar ratio of the curing agent (a)/the polymer (b) (mol/mol) is no less than 1/2.

A seventh aspect is the silicone based polymer foam according to any one of the first to sixth aspects in which the ASKER FP hardness is no greater than 50.

An eighth aspect is the silicone based polymer foam according to any one of the second to seventh aspects which is produced by dispersing the foaming agent (D) having a gaseous state in the resin composition to give a gas-containing resin composition, and thereafter injecting the gas-containing resin composition into a mold form to permit curing.

A ninth aspect is the silicone based polymer foam according to any one of the second to seventh aspects which is produced by adding the foaming agent (D) having a liquid and/or solid state to the resin composition to give a foamable resin composition, and thereafter permitting expansion of the foamable resin composition before or concurrently with permitting curing.

A tenth aspect is the silicone based polymer foam according to the ninth aspect in which the foaming agent (D) having a liquid and/or solid state is an active hydrogen group-containing compound.

An eleventh aspect is a process for producing a silicone based polymer foam which is the silicone based polymer foam according to any one of the first to tenth aspects, the process including adding the foaming agent (D) to a resin composition including: (a) a curing agent having at least two hydrosilyl groups in the molecular chain; (b) a polymer having at least one alkenyl group in the molecular chain and comprising a saturated hydrocarbon unit or an oxyalkylene unit as a repeating unit that constitutes the main chain; and (C) a hydrosilylation catalyst to give a foamable resin composition, and injecting the composition into a mold form to permit curing.

A twelfth aspect is the process for producing a silicone based polymer foam according to the eleventh aspect, in which the polymer (b) having at least one alkenyl group in the molecular chain and comprising a saturated hydrocarbon unit or an oxyalkylene unit as a repeating unit that constitutes the main chain is a linear polymer having a number average molecular weight of no lower than 10,000.

A thirteenth aspect is the process for producing a silicone based polymer foam according to the eleventh or twelfth aspect in which expansion is permitted before or concurrently with permitting curing of the resin composition.

A fourteenth aspect is the process for producing a silicone based polymer foam according to the eleventh or twelfth aspect including dispersing the foaming agent (D) in the resin composition using the foaming agent (D) having a gaseous state to give a gas-containing resin composition, and thereafter injecting the composition into a mold form followed by permitting curing.

A fifteenth aspect is a shock absorbing pad comprising the silicone based polymer foam according to any one of the first to tenth aspects.

A sixteenth aspect is a garment to which the shock absorbing pad according to the fifteenth aspect is attached at a site corresponding to at least one of the front body, the flank part, the back body and the hip around the lumbar.

A seventeenth aspect is the garment according to the sixteenth aspect in which the shock absorbing pad is attached in a detachable manner.

An eighteenth aspect is the garment according to the sixteenth or seventeenth aspect in which the garment is an underpants.

A nineteenth aspect is a method of preventing femoral fracture, the method including wearing a garment to which a shock absorbing pad comprising the silicone based polymer foam according to the fifteenth aspect is attached at a position where protection of the greater trochanter part of lateral portion of the femoral neck is enabled.

A twentieth aspect is a foam having a ratio $J_h/J_h^r$ of the creep compliance $J_h$ upon deformation to the creep compliance $J_h^r$ upon recovery being no less than 2.

A twenty first aspect is the foam according to the twentieth aspect in which the hardness measured with an ASKER FP type hardness scale is no greater than 50 degrees.

A twenty second aspect is the foam according to the twenty first aspect in which the hardness measured with an ASKER FP type hardness scale is no greater than 30 degrees.

A twenty third aspect is the foam according to any one of the twentieth to twenty second aspects in which the foam includes a silicone based polymer as a base resin.

A twenty fourth aspect is the foam according to the twenty third aspect in which the silicone based polymer is produced by curing a resin composition including: (a) a curing agent having at least two hydrosilyl groups in the molecular chain; (b) a polymer having at least one alkenyl group in the molecular chain and comprising a saturated hydrocarbon unit or an oxyalkylene unit as a repeating unit that constitutes the main chain; and (C) a hydrosilylation catalyst.

A twenty fifth aspect is the foam according to the twenty fourth aspect in which the polymer (b) has a number average molecular weight of no lower than 10,000.

A twenty sixth aspect is the foam according to the twenty fourth aspect in which the polymer (b) has a number average molecular weight of no lower than 15,000.

A twenty seventh aspect is the foam according to any one of the twenty fourth to twenty sixth aspects in which the repeating unit that constitutes the main chain of the polymer (b) is an oxypropylene unit.

A twenty eighth aspect is the foam according to any one of the twenty fourth to twenty eighth aspects in which the molar proportion of the curing agent (a) and the polymer (b) is no less than 1/2.

A twenty ninth aspect is the foam according to any one of the twenty fourth to twenty eighth aspects in which the molar proportion of the curing agent (a) and the polymer (b) is no less than 3/4.

A thirtieth aspect is the foam according to any one of the twenty fourth to twenty ninth aspects produced by dispersing the foaming agent (D) having a gaseous state in a resin composition including: (a) a curing agent having at least two hydrosilyl groups in the molecular chain; (b) a polymer having at least one alkenyl group in the molecular chain and comprising a saturated hydrocarbon unit or an oxyalkylene unit as a repeating unit that constitutes the main chain; and (C) a hydrosilylation catalyst to give a gas-containing resin composition, and thereafter injecting the gas-containing resin composition into a mold form to permit curing.

A thirty first aspect is the foam according to any one of the twenty fourth to twenty ninth aspects produced by adding the foaming agent (D) having a liquid and/or solid state to a resin composition including: (a) a curing agent having at least two hydrosilyl groups in the molecular chain; (b) a polymer having at least one alkenyl group in the molecular chain and comprising a saturated hydrocarbon unit or an oxyalkylene unit as a repeating unit that constitutes the main chain; and (C) a hydrosilylation catalyst to give a foamable resin composition, and thereafter permitting expansion before or concurrently with permitting curing the foamable resin composition.

A thirty second aspect is a process for producing the foam according to any one of the twenty fourth to thirty first aspects including mixing a resin composition including: (a) a curing agent having at least two hydrosilyl groups in the molecular chain; (b) a polymer having at least one alkenyl group in the molecular chain and comprising a saturated hydrocarbon unit or an oxyalkylene unit as a repeating unit that constitutes the main chain; and (C) a hydrosilylation catalyst with (D) a foaming agent, and thereafter injecting the mixture into a mold form followed by permitting curing.

A thirty third aspect is the process for producing the foam according to the thirty second aspect in which expansion is permitted before or concurrently with permitting curing of the resin composition.

A thirty fourth aspect is a process for producing a foam according to the thirty second or thirty third aspect including dispersing the foaming agent (D) in the resin composition using the foaming agent (D) having a gaseous state to give a gas-containing resin composition, and thereafter injecting the composition into a mold form followed by permitting curing.

A thirty fifth aspect is a molded product in which foamed resin particles are included in a base resin consisting of a soft resin.

A thirty sixth aspect is the molded product according to the thirty fifth aspect in which the soft resin is a silicone based polymer.

A thirty seventh aspect is the molded product according to the thirty sixth aspect in which the silicone based polymer is produced by curing a resin composition including (A) a curing agent having at least 1.1 hydrosilyl groups on average in the molecular chain, (B) a compound having at least one alkenyl group on average in the molecular chain, and (C) a hydrosilylation catalyst.

A thirty eighth aspect is the molded product according to the thirty sixth aspect in which the silicone based polymer is produced by curing a resin composition including (a) a curing agent having at least two hydrosilyl groups on average in the molecular chain, (B) a compound having at least one alkenyl group on average in the molecular chain, and (C) a hydrosilylation catalyst.

A thirty ninth aspect is the molded product according to the thirty seventh or thirty eighth aspect in which the compound (B) is a polymer (b) having at least one alkenyl group in the molecular chain and comprising a saturated hydrocarbon unit or an oxyalkylene unit as a repeating unit that constitutes the main chain.

A fortieth aspect is the molded product according to the thirty ninth aspect in which the molded product is a foam-molded product.

A forty first aspect is the molded product according to the thirty ninth or fortieth aspect in which the polymer (b) having at least one alkenyl group in the molecular chain and comprising a saturated hydrocarbon unit or an oxyalkylene unit as a repeating unit that constitutes the main chain has a number average molecular weight of no lower than 10,000.

A forty second aspect is the molded product according to the thirty ninth or fortieth aspect in which the polymer (b) having at least one alkenyl group in the molecular chain and comprising a saturated hydrocarbon unit or an oxyalkylene unit as a repeating unit that constitutes the main chain has a number average molecular weight of no lower than 15,000.

A forty third aspect is the molded product according to any one of the thirty ninth to forty second aspects in which the repeating unit that constitutes the main chain of the polymer (b) having at least one alkenyl group in the molecular chain and comprising a saturated hydrocarbon unit or an oxyalkylene unit as a repeating unit that constitutes the main chain is an oxypropylene unit.

A forty fourth aspect is the molded product according to any one of the thirty ninth to forty second aspects in which the molar proportion of the curing agent (a) having at least two hydrosilyl groups in the molecular chain, and the polymer (b) having at least one alkenyl group in the molecular chain and comprising a saturated hydrocarbon unit or an oxyalkylene unit as a repeating unit that constitutes the main chain is no less than 1/2.

A forty fifth aspect is the molded product according to any one of the thirty fifth to forty fourth aspects in which the foamed resin particles are particles produced by expanding a thermoplastic resin and/or a thermosetting resin.

A forty sixth aspect is the molded product according to the forty fifth aspect in which the foamed resin particles are produced by expanding at least one resin selected from polystyrene, polypropylene, and polyethylene.

A forty seventh aspect is a process for producing the molded product according to any one of the thirty fifth to forty sixth aspects including mixing a resin composition with the foamed resin particles, and thereafter curing the resin composition.

A forty eighth aspect is a process for producing the molded product according to any one of the fortieth to forty sixth aspects including mixing (a) a curing agent having at least two hydrosilyl groups in the molecular chain, (b) a polymer having at least one alkenyl group in the molecular chain and comprising a saturated hydrocarbon unit or an oxyalkylene unit as a repeating unit that constitutes the main chain, (C) a hydrosilylation catalyst, (D) a foaming agent, and the foamed resin particles to give a mixture, and injecting the mixture into a mold form to permit curing.

A forty ninth aspect is a shock absorber comprising the molded product according to any one of the thirty fifth to forty sixth aspects.

A fiftieth aspect is a garment to which the shock absorbing core according to the forty ninth aspect is attached at a site corresponding to at least one of the front body, the flank part, the back body and the hip around the lumbar.

Effects of the Invention

According to the present invention, a silicone based polymer foam that is flexible and exhibited favorable tactile impression can be provided without using a material about which the toxicity is concerned.

The shock absorbing pad of the present invention is superior in shock absorbing capacity, and exhibits favorable feel in wearing, accompanied by less toxicity. In addition, since the garment to which the shock absorbing pad of the present invention is attached exhibits favorable feel in wearing, it enables wearing for a long time period, and thus it is effective in preventing bone fracture due to falling that accidentally occurs.

According to the present invention, a soft and flexible foam can be provided.

A molded product which is light-weight and superior in formability and safety, and a shock absorber in which the same is used can be provided. Furthermore, when the molded product is expanded, a molded product having a low density, and being superior in flexibility and shock absorbing capacity can be provided. This shock absorber is superior in the shock absorbing capacity as well as the feel in wearing.

BEST MODE FOR CARRYING OUT THE INVENTION

Figure 1:
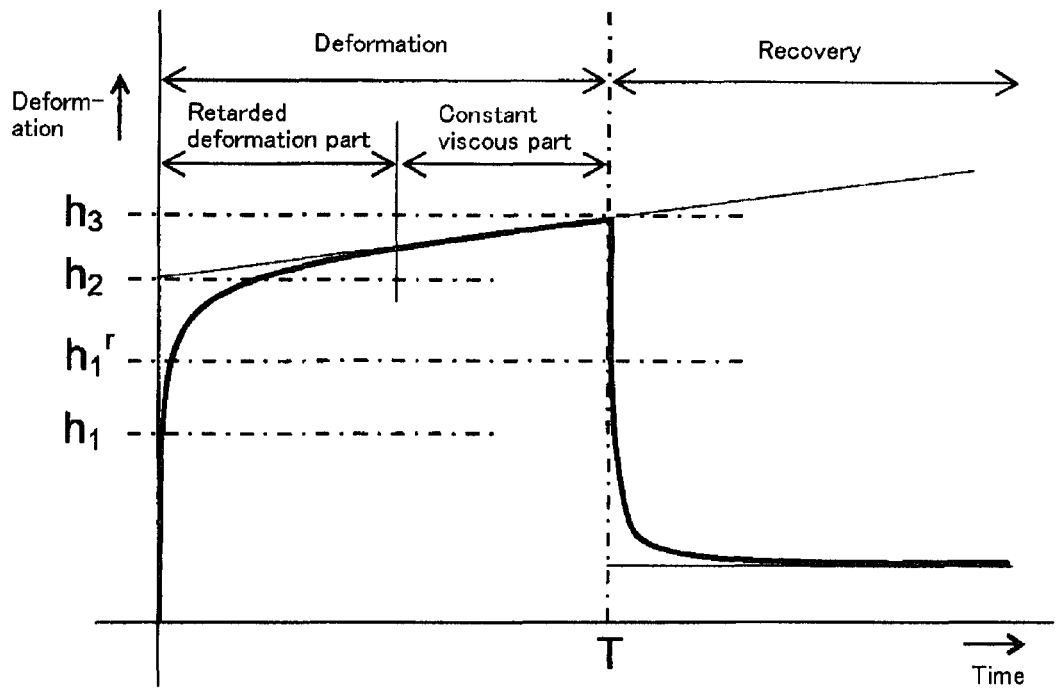
FIG. 1 shows an example of a creep curve of the foam of the present invention.

Hereinafter, the present invention will be explained in more detail.

In one aspect, the present invention provides a foam comprising a silicone based polymer as a base resin. Although the foam is not particularly limited as long as it is a foam produced using a resin having a siloxane unit in the molecular skeleton as a base resin, it is preferred to use, as a base resin, for example, a resin produced by curing a resin composition including a compound having hydrosilyl groups, a compound having an alkenyl group and a hydrosilylation catalyst as a component for constituting a silicone based polymer since superior expansion formability and mechanical properties, and a good balance of various physical properties in use as a shock absorbing pad are achieved. Preferably, by using a certain silicone based polymer as the base resin, a foam that is flexible and exhibits favorable tactile impression can be obtained.

As the compound having hydrosilyl groups, (A) a curing agent having at least 1.1 hydrosilyl groups in the molecular chain (hereinafter, may be merely referred to as "curing agent (A)") is preferred, and (a) a curing agent having at least two hydrosilyl groups in the molecular chain (hereinafter, may be merely referred to as "curing agent (a)") is more preferred. In addition, as the compound having an alkenyl group, (B) a compound having at least one alkenyl group on average in the molecular chain (hereinafter, may be merely referred to as "compound (B)") is preferred, and (b) a polymer having at least one alkenyl group in the molecular chain and comprising a saturated hydrocarbon unit or an oxyalkylene unit as a repeating unit that constitutes the main chain (hereinafter, may be merely referred to as "polymer (b)") is more preferred.

Specifically, it is preferred that the silicone based polymer foam be produced by curing a foamable resin composition including the curing agent (a) having at least two hydrosilyl groups in the molecular chain, the polymer (b) having at least one alkenyl group in the molecular chain and comprising a saturated hydrocarbon unit or an oxyalkylene unit as a repeating unit that constitutes the main chain, the hydrosilylation catalyst (C), and the foaming agent (D), since various physical properties such as expansion formability and mechanical properties can be readily adjusted, and good balance of physical properties is likely to be achieved.

In addition thereto, a cell regulator, a filler, a storage stabilizer, a thickening agent and the like may be added as needed in the range not to deteriorate the effects of the present invention. It should be noted that the foaming agent (D) is preferably mixed with the resin composition including the curing agent (a), the polymer (b) and the hydrosilylation catalyst (C).

The compound having hydrosilyl groups may be a curing agent (A) having preferably at least 1.1, more preferably at least 2, and still more preferably 3 or more hydrosilyl groups in the molecular chain. The upper limit of the number of the hydrosilyl groups is preferably 100, more preferably 70, still more preferably 50, yet more preferably 20, particularly preferably 15, and extremely preferably 12. Due to thus having hydrosilyl groups in the molecular chain, each hydrosilyl group reacts with the alkenyl group that is present in the molecular chain of the compound (B) having at least one alkenyl group in the molecular chain, preferably the polymer (b) having at least one alkenyl group in the molecular chain and comprising a saturated hydrocarbon unit or an oxyalkylene unit as a repeating unit that constitutes the main chain, thereby permitting curing.

When the number of the hydrosilyl group is less than 1.1, the curing speed in allowing the resin composition of the present invention to cure by a hydrosilylation reaction is lowered, whereby insufficient hardening may be caused. Moreover, when the number of the hydrosilyl group is more than 100, stability of the curing agent (A), preferably the curing agent (a), in other words, stability of the resin composition and the foamable resin composition of the present invention may be inferior, and in addition, a large number of the hydrosilyl groups are likely to remain in the cured resin composition even after curing, which can be the cause of cracking.

It should be noted that the phrase "having one hydrosilyl group" herein means to have one SiH bond. Although two hydrosilyl groups will be included in the case of $SiH_2$, better curability is achieved when the number of H bonded to one Si is 1, and this number is preferred also in view of flexibility. In the present invention, the phrase "one hydrosilyl group on average in the molecular chain" is decided by multiplying the number of hydrosilyl groups per gram by the number average molecular weight of the substance. In the present invention, also with respect to functional groups other than the hydrosilyl group, the decided number of the functional groups in the molecular chain is indicated similarly, unless otherwise stated in particular.

With respect to the molecular weight of the curing agent (A) or the curing agent (a), the upper limit of the number average molecular weight (Mn) is preferably 30,000, more preferably 20,000, and still more preferably 15,000 in light of dispersibility of the foaming agent component (D) described later, and processing characteristics of the obtained foam, and the like. Also taking into consideration the reactivity and compatibility with the compound (B) and/or the polymer (b) as well, the number average molecular weight is particularly preferably no lower than 300 and no higher than 10,000.

The structure of the curing agent (a) is not particularly limited as long as it has certain number of hydrosilyl groups in the molecular chain, and illustrative examples may include hydrocarbon based curing agents and polysiloxane based curing agents.

The hydrocarbon based curing agent is represented by the general formula (1):

$$R^1X_a \quad (1)$$

wherein, X represents a group including at least one hydrosilyl groups; $R^1$ represents a monovalent to tetravalent hydrocarbon group having 2 to 150 carbon atoms; a is an integer selected from 1 to 4; and provided that X includes only one hydrosilyl group, a is 2 or more.

Specific examples of suitable hydrocarbon based curing agent include those having a number average molecular weight of no higher than 30,000 and including hydrosilyl groups.

Specific examples of the X include hydrosilyl groups having only one silicone atom such as e.g., $-SiH_n(CH_3)_{3-n}$, $-SiH_n(C_2H_5)_{3-n}$, $-SiH_n(C_6H_5)_{3-n}$ (wherein, n=1 to 3), and $-SiH_2(C_6H_{13})$,

[chemical formula 1]

—Si(CH$_3$)$_2$SiCH$_3$H$_2$,

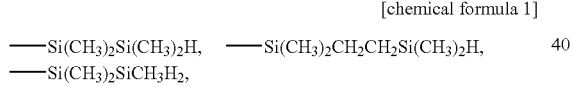

—Si(CH$_3$)$_2$NHSi(CH$_3$)$_2$H,    —Si(CH$_3$)$_2$N[Si(CH$_3$)$_2$H]$_2$,

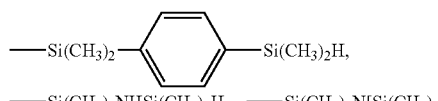

for example, hydrosilyl groups represented by the chemical formula 1 including two or more silicone atoms,

[chemical formula 2]

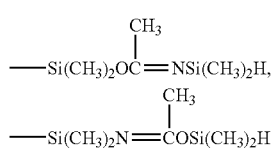

(R each independently represents any one of CH$_3$, C$_2$H$_5$, C$_6$H$_5$, and OSi(CH$_3$)$_3$
n = 0 to 50)

-continued

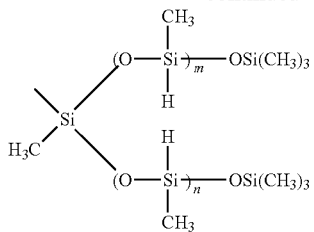

(m + n = 1~50)

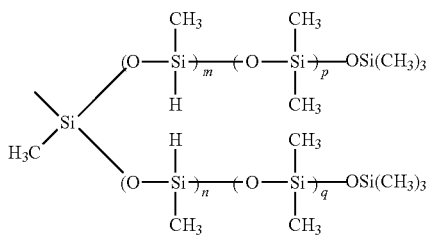

(m + n ≧ 1,
m + n + p + q = 2~50)

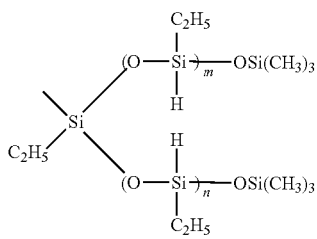

(m + n = 1~50)

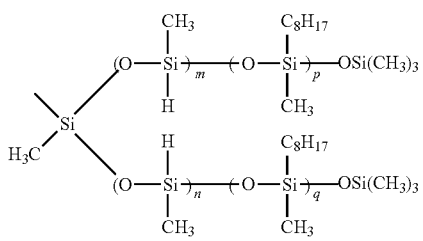

(m + n ≧ 1,
m + n + p + q = 2~50)

[chemical formula 3]

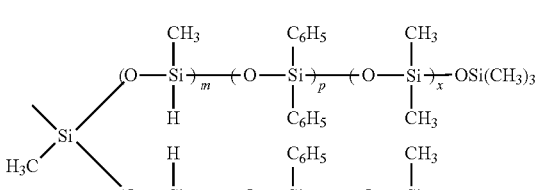

(m + n ≧ 1,
m + n + p + q + x + y = 2~50)

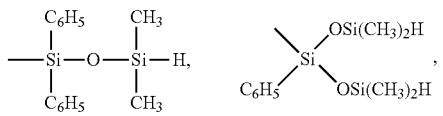

-continued

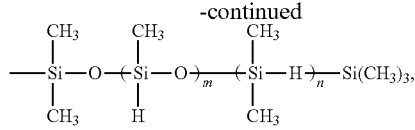

(m + n = 1~50)

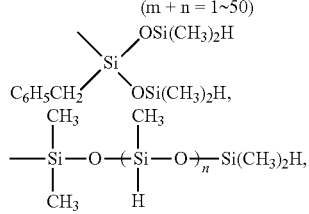

(n = 0~50)

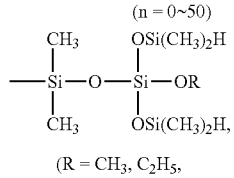

(R = CH$_3$, C$_2$H$_5$,
C$_5$H$_6$, Si(CH$_3$)$_3$)

[chemical formula 4]

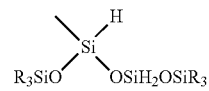

(R each independently represents any
one of CH$_3$, C$_2$H$_5$, and C$_6$H$_5$)

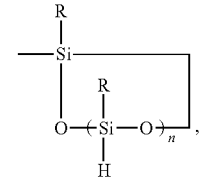

(R each independently represents any
one of CH$_3$, C$_2$H$_5$, and C$_6$H$_5$ n = 1~20)

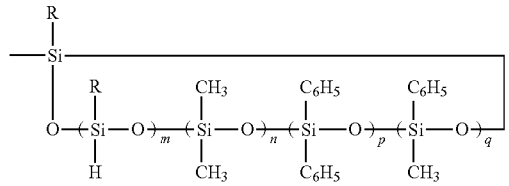

(R each independently represents any
one of CH$_3$, C$_2$H$_5$, and C$_6$H$_5$, m ≧ 1,
m + n + p + q = 2~20)

for example, hydrosilyl groups derived from a variety of linear, branched, or cyclic polyvalent hydrogen siloxane represented by the chemical formula 2 to the chemical formula 4, and the like. In the formula, the unit present in the number of m and the unit present in the number of p, the unit present in the number of n and the unit present in the number of q, the unit present in the number of m and the unit present in the number of p and the unit present in the number of x, the unit present in the number of n and the unit present in the number of q and the unit present in the number of y, the unit present in the number of m and the unit present in the number of n, and further, the unit present in the number of m and the unit present in the number of n and the unit present in the number of p and the unit present in the number of q are described as if they are linked by a block bond, but these may be linked by either a block bond or a random bond. A similar designation is employed also in the following description.

Among the various hydrosilyl groups described above, the molecular weight of the part X$_a$ in the general formula (1) is no higher than 500 is preferred because the hydrocarbon based curing agent being the curing agent (a) is accompanied by lower possibility of deterioration of compatibility with other organic polymer, and the hydroxyl group represented by the chemical formula 5 is further preferred also taking into consideration the reactivity of the hydrosilyl group.

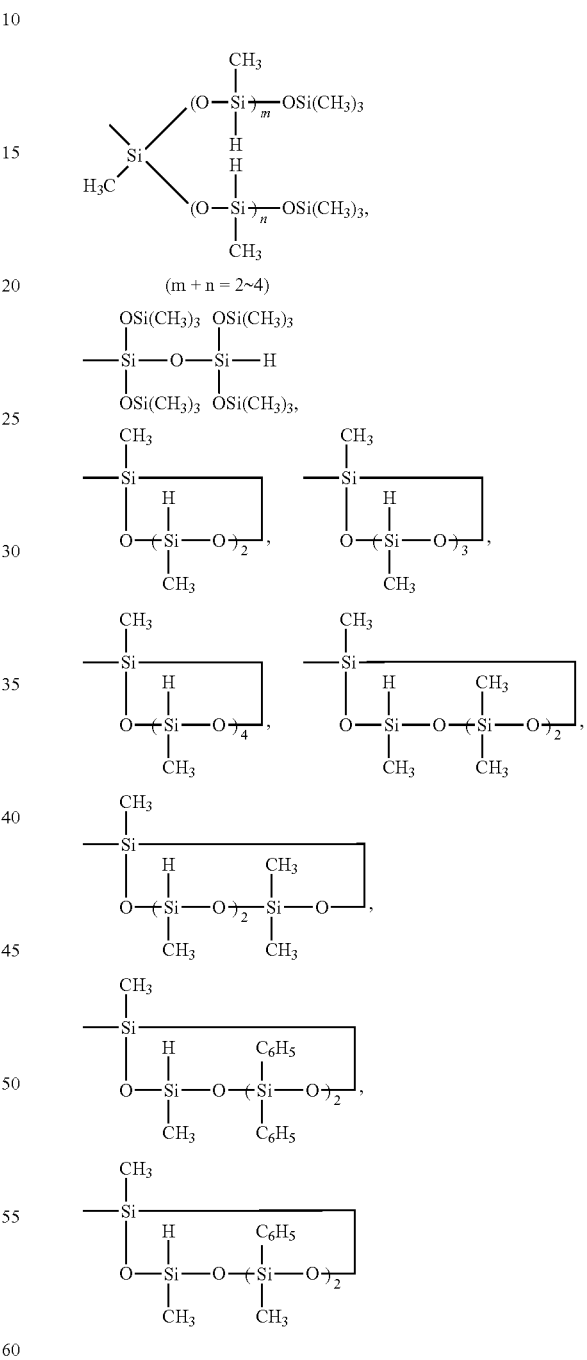

In the general formula (1), R$^1$ represents a monovalent to tetravalent hydrocarbon group having 2 to 150 carbon atoms, and may be a group comprising a polymer. Specific examples except for the polymer include those represented by the chemical formula 6 and the chemical formula 7 (disclosed in JP-A No. Hei 3-95266, etc.), and the like.

[chemical formula 6]

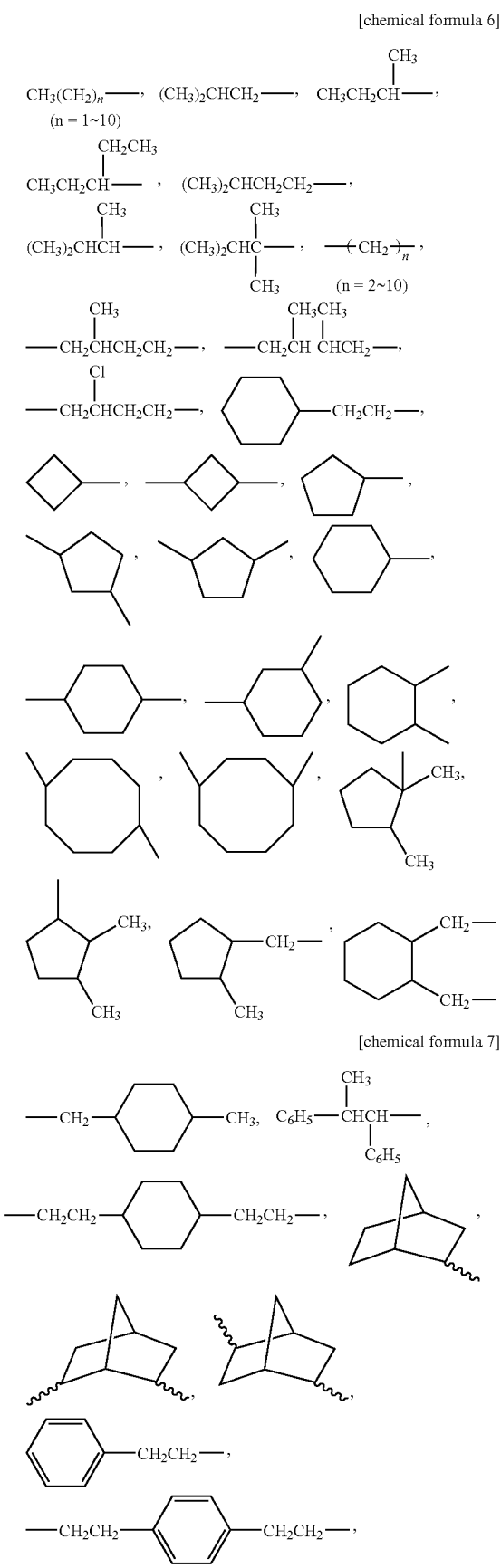

[chemical formula 7]

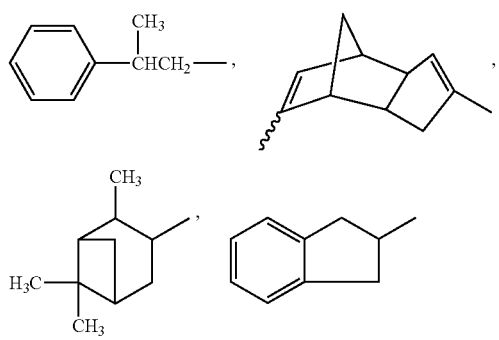

Furthermore, specific examples of the $R^1$ group comprising a polymer include groups obtained by polymerization, which have 1 to 4 bonding hand(s), of an olefinic compound having 2 to 6 carbon atoms such as ethylene, propylene, 1-butene or isobutylene as a major monomer, as well as groups obtained by homopolymerization of a diene based compound such as butadiene or isoprene, or groups obtained by copolymerization of the olefinic compound and the diene based compound, followed by hydrogenation, which have 1 to 4 bonding hand(s), and the like.

Among the hydrocarbon based curing agents represented by the general formula (1) as described above, combinations in which $R^1$ is a hydrocarbon group having 5 to 20 carbon atoms, and X is a group represented by the chemical formula 5 are preferred in light of superior compatibility with the polymer (b), and capability of enhancing the reactivity in curing the resin composition including the curing agent (a), the polymer (b) and the hydrosilylation catalyst (C), and enabling a favorable net structure to be formed. Further, since the source material is readily available, ones in which $R^1$ is a hydrocarbon group having 5 to 12 carbon atoms are more preferred among these. In light of capability of particularly improving compatibility with the polymer (b), cyclic polysiloxane compounds are more preferred among those in which X is a group represented by the chemical formula 5. The compounds obtained by such combinations are preferred as the hydrocarbon based curing agent. Specific examples of the compound include, for example, those represented by the chemical formula 8, and the like.

[chemical formula 8]

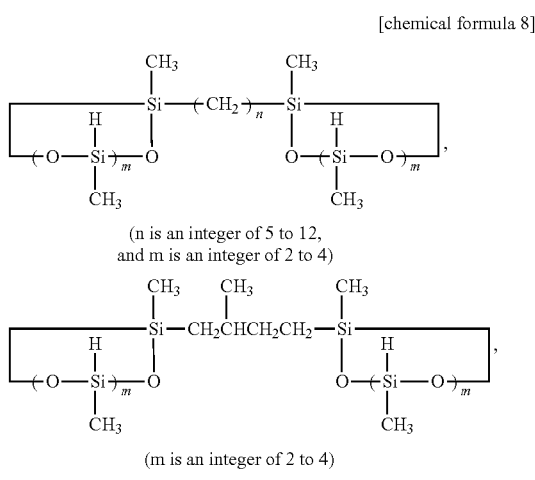

-continued

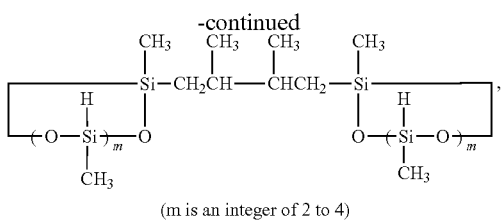

(m is an integer of 2 to 4)

The method for producing the hydrocarbon based curing agent is not particularly limited, and any method may be employed for production. For example, (i) a method in which a hydrocarbon based compound having an SiCl group in the molecule is treated with a reducing agent such as $LiAlH_4$ or $NaBH_4$, whereby the SiCl group in the compound is reduced to give an SiH group; (ii) a method in which a hydrocarbon based compound having a functional group $X^1$ in the molecule is allowed to react with a compound having both a functional group $Y^1$ that reacts with the functional group $X^1$ in the molecule, and a hydrosilyl group; (iii) a method in which a hydrocarbon based compound including an alkenyl group is subjected to selective hydrosilylation with a polyhydrosilane compound having at least two hydrosilyl groups, and allowing the hydrosilyl group to be left in the molecule of the hydrocarbon based compound even after the reaction, and the like may be exemplified.

Among the aforementioned methods, the method (iii) is suitably employed since the production steps are simple, in general. In this case, two or more hydrosilyl groups included in a part of the polyhydrosilane compound may react with the alkenyl group in the hydrocarbon based compound to increase the molecular weight, but thus obtained product having an increased molecular weight is also any how permissible for use as the curing agent (a).

As the curing agent (a), a polysiloxane based curing agent may be also used. Specific examples include linear or cyclic polyorganohydrogen siloxane as represented by the chemical formula 9 to the chemical formula 11, including polyoxyalkylene modified products, styrenes modified products, olefin modified products, and the like.

[chemical formula 9]

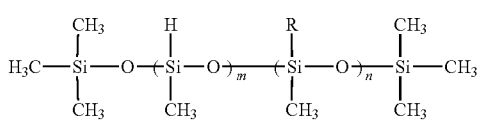

(wherein, m and n are an integer satisfying the relationship of 2≤m+n≤100, 2≤m, and 0≤n; R represents a methyl group, a polyoxyalkylene group having a molecular weight of 100 to 10,000, or a hydrocarbon group having 2 to 20 carbon atoms which may include one or more phenyl groups; provided that R is included in multiple numbers, these may not be the same.)

[chemical formula 10]

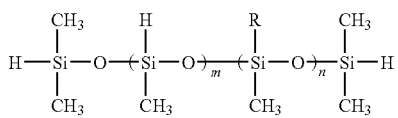

(wherein, m and n are an integer satisfying the relationship of 2≤m+n≤100, 0≤m, and 0≤n; R is a methyl group-based, a polyoxyalkylene group having a molecular weight of 100 to 10,000, or a hydrocarbon group having 2 to 20 carbon atoms which may include one or more phenyl groups; provided that R is included in multiple numbers, these may not be necessarily the same.)

[chemical formula 11]

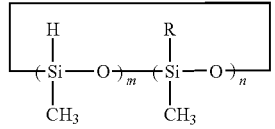

(wherein, m and n are an integer satisfying the relationship of 3≤m+n≤20, 2≤m≤19, 0≤n≤18; R represents a methyl group, a polyoxyalkylene group having a molecular weight of 100 to 10,000, or a hydrocarbon group having 2 to 20 carbon atoms which may include one or more phenyl groups; provided that R is included in multiple numbers, these may not be necessarily the same.)

For further improving the compatibility with the polymer (b), those in which R includes a phenyl group are preferred among the compounds represented by the chemical formula 9 to the chemical formula 11. Further, R is preferably —$CH_2$—$CH_2$-$C_6H_5$, —$CH_2$—$CH(CH_3)$—$C_6H_5$ in light of availability, and R is preferably —$CH_2$—$CH(CH_3)$—$C_6H_5$ in light of storage stability.

The compound (B) in the present invention is not particularly limited as long as it is a compound having at least one alkenyl group on average in the molecular chain, and for example, compounds having a molecular weight of 100 to 100,000 may be exemplified. Specifically, monomers such as styrene, MMA, 1-decane and 1,9-decadiene, polyethers, polyesters, polyolefins and the like having an alkenyl group at the end or the side chain may be exemplified.

Still further, a polymer (b) having at least one alkenyl group in the molecular chain, and comprising a saturated hydrocarbon unit or an oxyalkylene unit as a repeating unit that constitutes the main chain may be suitably used. The compound (B) is a component that permits curing through a hydrosilylation reaction with the curing agent (A). Since it has at least one alkenyl group in the molecular chain, the hydrosilylation reaction is caused to give a polymerized state, leading to hardening.

The number of the alkenyl groups included in the compound (B) is necessarily at least 1 in terms of ability to permit a hydrosilylation reaction with the curing agent (A). In light of the curability and flexibility, the alkenyl group is preferably present at both two ends of the molecular chain. The polymer (b) is preferably a linear polymer having a number average molecular weight of no lower than 10,000, having at least one alkenyl group in the molecular chain, and comprising a saturated hydrocarbon unit or an oxyalkylene unit as a repeating unit that constitutes the main chain. The term "linear" herein means to have a linear molecular structure, but may include branches to some extent, and thus a linear polymer covers those including branches less than the main chain in terms of the molecular weight.

With respect to the molecular weight of the polymer (b), when the repeating unit that constitutes the main chain comprises a saturated hydrocarbon unit, in light of the flexibility, tactile impression, handlability and the like of the resulting silicone based polymer foam, the foam and the molded product, the number average molecular weight is preferably no lower than 500, more preferably no lower than 1,000, still more preferably no lower than 10,000 and particularly preferably no lower than 15,000, while preferably no higher than 50,000, and more preferably no higher than 30,000. Moreover, liquid matters or flowable matters having a molecular weight of approximately 15,000 to 30,000 are preferable.

The phrase "comprising a saturated hydrocarbon unit as a repeating unit that constitutes the main chain" referred to herein has a meaning of a state in which a carbon-carbon unsaturated bond other than the aromatic ring is not substantially included. Therefore, the main chain can be obtained by the following method or the like, when the repeating unit that constitutes the main chain of the polymer (b) comprises a saturated hydrocarbon unit as described above:

(1) polymerization of an olefinic compound having 2 to 6 carbon atoms such as ethylene, propylene, 1-butene or isobutylene as a major monomer; or (2) homopolymerization of a diene based compound such as butadiene or isoprene, or copolymerization of the aforementioned olefinic compound with the diene based compound, followed by hydrogenation. However, in light of ease in introducing a functional group into the end, ease in regulating the molecular weight, capability of increasing the number of end functional groups and the like, any one of an isobutylene based polymer, a hydrogenated polybutadiene based polymerized product, and a hydrogenated polyisoprene based polymer is preferred.

The isobutylene based polymer described above may be formed with an isobutylene unit as all the monomer units, or may include a monomer unit that is copolymerizable with isobutylene in the range of preferably no more than 50% by weight, more preferably no more than 30% by weight, and still more preferably no more than 10% by weight of the isobutylene based polymer.

As the monomer component that is copolymerizable with isobutylene, for example, olefins having 4 to 12 carbon atoms, vinyl ethers, aromatic vinyl compounds, vinylsilanes, acrylsilanes, and the like may be exemplified. Specific examples of such copolymerization component include 1-butene, 2-butene, 2-methyl-1-butene, 3-methyl-1-butene, pentene, 4-methyl-1-pentene, hexene, vinylcyclohexane, methylvinyl ether, ethylvinyl ether, isobutylvinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinylmethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane, and the like.

Among the monomer components that are copolymerizable with isobutylene, compounds other than the compounds including an alkoxysilyl group are preferred due to ease in copolymerization.

Also in the hydrogenated polybutadiene based polymers and the hydrogenated polyisoprene based polymers, other monomer unit as described above may be included in addition to the monomer unit to be the principal component, in a similar manner to the case of the aforementioned isobutylene based polymers.

Moreover, in the saturated hydrocarbon based polymer used as the polymer (b), a monomer unit such as a polyene compound which leaves double bonds after polymerization in the range that enables the object of the present invention to be achieved, like butadiene or isoprene may be included in a small amount, in the range of preferably no more than 10% by weight, more preferably no more than 5% by weight, and still more preferably no more than 1% by weight.

With respect to the method of introducing the alkenyl group into the main chain comprising a saturated hydrocarbon unit to obtain the polymer (b), any of a variety of well-known methods reported hitherto may be used, and they can be generally classified into methods of introducing the alkenyl group following polymerization, and methods of introducing the alkenyl group during polymerization.

As the method of introducing the alkenyl group following polymerization, the saturated hydrocarbon based polymer having an alkenyl group at the end, the main chain or the side chain can be produced by, for example, converting the hydroxyl group at the end, the main chain or the side chain into a group such as —ONa or —OK, and thereafter allowing to react with an organic halogen compound represented by the general formula (2):

$$CH_2=CH-R^2-Y \qquad (2)$$

(wherein, Y represents a halogen atom such as a chlorine atom, a bromine atom or an iodine atom; $R^2$ represents a divalent organic group represented by —$R^3$—, —$R^3$—OCO— or —$R^3$—CO— (wherein, $R^3$ represents a divalent hydrocarbon group having 1 to 20 carbon atoms (preferable specific examples including an alkylene group, a cycloalkylene group, an arylene group, and an aralkylene group), with a divalent group selected from the chemical formula 12 (wherein, $R^4$ represents a hydrocarbon group having 1 to 10 carbon atoms) being particularly preferred)

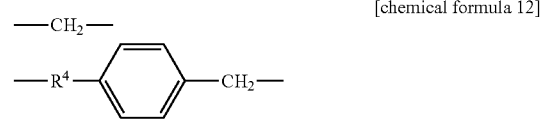

[chemical formula 12]

Preferable specific examples of the saturated hydrocarbon based polymer include polyisobutylene, hydrogenated polybutadiene, hydrogenated polyisoprene based polymers and the like: having two alkenyl groups at both two ends; being linear; having a number average molecular weight (Mn) of 2,000 to 20,000; and having a ratio Mw/Mn, i.e., a ratio of the weight average molecular weight (Mw) to the number average molecular weight (Mn) being approximately 1.1 to 1.2.

With respect to the molecular weight of the polymer (b) comprising an oxyalkylene unit as a repeating unit that constitutes the main chain, in light of the balance of the flexibility, the tactile impression and the reactivity, the number average molecular weight (Mn) is preferably no lower than 500, more preferably no lower than 1,000, still more preferably no lower than 10,000, further more preferably no lower than 12,000, and particularly preferably no lower than 15,000. Although the upper limit value is not particularly limited, it is preferably no higher than 50,000, more preferably no higher than 30,000, and still more preferably no higher than 25,000.

When the repeating unit that constitutes the main chain of the polymer (b) is an oxyalkylene unit, it is produced by polymerizing $C_2$ to $C_4$ alkyleneoxide using as a starting material for forming the main chain a compound having two or more active hydrogen groups such as, for example, ethylene glycol, propylene glycol, a bisphenol compound, glycerin, trimethylolpropane, pentaerythritol or the like.

Specific examples of the polymer (b) comprising an oxyalkylene unit as a repeating unit that constitutes the main chain include random or block copolymers constituted with two or more selected from the group consisting of polyethylene oxide, polypropylene oxide, polybutylene oxide, ethylene oxide, propylene oxide and butylene oxide, and the like. It is preferred that the alkenyl group is introduced into the end of those copolymers, similarly to the case in which an alkenyl group is introduced into the main chain comprising a saturated hydrocarbon unit.

In preferable specific examples of the polymer (b) comprising an oxyalkylene unit as a repeating unit that constitutes the main chain, the repeating unit of the main chain is preferably an oxypropylene unit in light of lowering of the hardness of the cured product, as well as the flexibility and tactile impression.

In the silicone based polymer foam, the foam and the molded product of the present invention, when the resin composition including the curing agent (a), the polymer (b) and the hydrosilylation catalyst (C) is used in these matters, the ratio of the curing agent (a) and the polymer (b) may depend on the numbers of the hydrosilyl group in the curing agent (a), and the alkenyl group in the polymer (b). However, in light of the flexibility and tactile impression, the curing agent (a) is included preferably no less than 1/2, more preferably no less than 3/4, and still more preferably no less than 4/5 with respect to the polymer (b), in terms of the molar proportion. The amount by "mol" of the curing agent (A) and the polymer (B) in the present invention refers to a value derived by dividing the weight by the number average molecular weight.

Moreover the content of the hydrosilyl group in the curing agent (a) is preferably 0.1 to 50 mol, and more preferably 0.2 to 30 mol per mol of the alkenyl group in the compound (B).

The hydrosilylation catalyst (C) of the present invention is not particularly limited as long as it can be used as a hydrosilylation catalyst, and an any arbitrary catalyst may be used. Specific examples of the hydrosilylation catalyst (C) include platinum supports; supports of alumina, silica, carbon black and the like, having solid platinum supported thereto; chloroplatinic acid; complexes of chloroplatinic acid with an alcohol, aldehyde, ketone or the like; platinum-olefin complexes such as, for example, $Pt(CH_2=CH_2)_2(PPh_3)_2$ and $Pt(CH_2=CH_2)_2Cl_2$; platinum-vinylsiloxane complexes such as, for example, $Pt_n(ViMe_2SiOSiMe_2Vi)_m$ and $Pt[(MeViSiO)_4]_m$; platinum-phosphine complexes such as, for example, $Pt(PPh_3)_4$ and $Pt(PBu_3)_4$; platinum-phosphite complexes such as, for example, $Pt[P(OPh)_3]_4$ and $Pt[P(OBu)_3]_4$; dicarboxylic dichloroplatinum, and the like. In the above formulae, Me represents a methyl group; Bu represents a butyl group; Vi represents a vinyl group; Ph represents a phenyl group; and m and n are an integer of no less than 1.

Further, a platinum-hydrocarbon complex disclosed in U.S. Pat. No. 3,159,601 and U.S. Pat. No. 3,159,662 to Ashby, a platinum alcoholate catalyst disclosed in U.S. Pat. No. 3,220,972 to Lamoreaux, a chloroplatinic acid-olefin complex disclosed in U.S. Pat. No. 3,516,946 to Modic, and the like can be also used advantageously in the present invention.

Moreover, a catalyst other than platinum compounds can be also used, and specific examples thereof include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_2$ (wherein, Ph represents a phenyl group), and the like. At least one selected from the group of hydrosilylation catalysts exemplified in the foregoing is preferably used as the hydrosilylation catalyst (C). Among those, in light of the catalyst activity and safety, one or more selected from chloroplatinic acid, the platinum-olefin complex, and the platinum-vinylsiloxane complex is preferably used.

The content of the hydrosilylation catalyst (C) per mol of the alkenyl group in the polymer (B) is preferably $10^{-8}$ to $10^{-1}$ mol, and more preferably $10^{-6}$ to $10^{-3}$ mol. When the content is lower than $10^{-8}$ mol, curing may not proceed sufficiently. To the contrary, when the content is higher than $10^{-1}$ mol, control of the hardness of the resin composition may be difficult, or the resulting silicone based polymer foam, the foam and the molded product may be colored.

When the foaming agent (D) is used in the present invention, although not particularly limited, foaming agents that exhibit the state of gas, liquid, or solid at an ordinary temperature (23° C.) may be exemplified. Further, when the foaming agents are classified in other aspect, physical foaming agents such as volatile liquids and gases generally used in organic foams such as, for example, polyurethane, phenol resin, polystyrene, polyolefin, etc., chemical foaming agents that generate a gas by heat degradation or a chemical reaction, active hydrogen group-containing compounds that leads to generation of hydrogen via a reaction with the hydrosilyl group, and the like may be involved. Among these, active hydrogen group-containing compounds are preferably used since they are responsible for improvement of the continuous cell rate, and expression of physical properties such as flexibility, etc. It should be noted that at least one selected from physical foaming agents, chemical foaming agents, and active hydrogen compounds can be used as the foaming agent (D).

The aforementioned physical foaming agent is not particularly limited as long as it does not inhibit a hydrosilylation reaction, but in light of foamability, workability, and safety, the boiling point of the physical foaming agent is preferably no higher than 100° C., and more preferably no higher than 50° C. Specifically, organic compounds such as hydrocarbon, chlorofluorocarbon (freon), alkyl chloride and ethers, and inorganic compounds such as carbon dioxide, nitrogen and air may be exemplified, and in light of the environmental suitability, a compound selected from a hydrocarbon, an ether, carbon dioxide, nitrogen, and air is preferably used.

Of these, examples of the hydrocarbon include methane, ethane, propane, n-butane, isobutane, n-pentane, isopentane, neopentane, n-hexane, 2-methylpentane, 3-methylpentane, 2,2-dimethylbutane, 2,3-dimethylbutane, cyclobutane, cyclopentane, cyclohexane, and the like.

Also, examples of the ether include dimethyl ether, diethyl ether, ethylmethyl ether, dipropyl ether, diisopropyl ether, butylmethyl ether, butylethyl ether, tert-butylmethyl ether, tert-butylethyl ether, 1,1-dimethylpropyl methyl ether, and the like.

When mechanical stirring is carried out in the air during production of the foam, bubbles may be formed by the air entrained along with stirring. Thus, such bubbles are also believed to be exemplified as one of the physical foaming agents. However, when any of these physical foaming agents is used, alteration of physical properties after foam molding due to remaining matters is concerned. Therefore, it is preferred that the remaining foaming agent be removed after forming the foam, by accelerating curing by heating at a temperature no lower than the boiling point of the physical foaming agent employed.

The chemical foaming agent is not particularly limited as long as it does not inhibit the hydrosilylation reaction, but for example, inorganic chemical foaming agents such as $NaHCO_3$, organic chemical foaming agents and the like may be included.

The active hydrogen group-containing compound is not particularly limited as long as it is a compound including an active hydrogen group that generates hydrogen after reacting with the hydrosilyl group, and the following compounds may be exemplified. More specifically, illustrative examples of the active hydrogen-containing compound include alcohols, carboxylic acids, compounds having a phenolic hydroxyl group, and water.

Specific examples include water; alcohols such as:

monohydric alcohols such as methanol, ethanol, n-propanol, iso-propanol, n-butanol, iso-butanol, tert-butanol, ethylene glycol monomethyl ether, ethylene glycol monoethyl ether, ethylene glycol monopropyl ether, ethylene glycol monobutyl ether, diethylene glycol monomethyl ether, ethylene glycol monophenyl ether, ethylene glycol monoallyl ether, and glycerin diallyl ether; polyhydric alcohols such as ethylene glycol, propylene glycol, 1,4-butylene glycol, 1,3-butylene glycol, 2,3-butylene glycol, diethylene glycol, triethylene glycol, neopentyl glycol, 1,6-hexamethylene glycol, 1,9-nonamethylene glycol, glycerin, trimethylolpropane, pentaerythritol, sorbitol, sucrose, and glycerin monoallyl ether;

polypropylene glycol, polyethylene glycol, copolymers of the same, polytetramethylene glycol, polyether polyols having 3 or more hydroxyl groups in one molecule constituted with sorbitol, sucrose, tetraethylenediamine, ethylenediamine or the like as an initiator; polyester polyols such as adipate based polyols, polycaprolactone based polyols, and polycarbonate based polyols;

epoxy modified polyols; polyether ester polyols; phenolic polyols such as benzylic ether type phenol polyol; fluorine polyols such as LUMIFLON® (manufactured by Asahi Glass Co., Ltd.); polybutadiene polyols; hydrogenated polybutadiene polyols; castor oil based polyols; halogen-containing flame-retardant polyols; phosphorus-containing flame-retardant polyols;

2-hydroxyethyl (meth)acrylate, 2-hydroxypropyl (meth) acrylate, 2-hydroxyethylvinyl ether, N-methylol (meth) acrylamide, "Alonics 5700" manufactured by Toagosei Chemical Industry Co., Ltd., 4-hydroxystyrene, "HE-10", "HE-20", "HP-10" and "HP-20" manufactured by Nippon Shokubai Co., Ltd. (any of them being an acrylic acid ester oligomer having a hydroxyl group at the end), Blemmer series manufactured by NOF Corporation, including PP series (polypropylene glycol methacrylate), Blemmer PE series (polyethylene glycol monomethacrylate), Blemmer PEP series (polyethylene glycol polypropylene glycol methacrylate), Blemmer AP-400 (polypropylene glycol monoacrylate), Blemmer AE-350 (polyethylene glycol monoacrylate), Blemmer NKH-5050 (polypropylene glycol polytrimethylene monoacrylate) and Blemmer GLM (glycerol monomethacrylate), hydroxyl group-containing vinyl based monomers such as ε-caprolactone modified hydroxyalkyl vinyl based monomers obtained by a reaction of a hydroxyl group-containing vinyl based compound with ε-caprolactone (it should be noted that the hydroxyl group-containing vinyl based monomer can be used as any one of the curing agent (A) component and the foaming agent (D)); acrylic resins having a hydroxyl group which can be obtained by copolymerization of the hydroxyl group-containing vinyl based monomer with acrylic acid, methacrylic acid, or a derivative thereof; as well as resins having a hydroxyl group such as alkyd resins, and epoxy resins;

carboxylic acids such as monovalent saturated carboxylic acids like acetic acid and propionic acid; compounds having a phenolic hydroxyl group such as phenol, cresol, xylenol, resorcin, catechol, pyrogallol, bisphenol A, bisphenol B, bisphenol S, and phenol resins;

and the like. Moreover, for adjusting the expansion speed, two or more active hydrogen group-containing compounds may be used in combination.

Among these active hydrogen group-containing compounds, at least one selected from primary saturated hydrocarbon alcohols such as methanol, ethanol, n-propanol and n-butanol, polyether polyols, and water is preferred, in light of the reactivity and handling characteristics. Also, in view of the flexibility and ability to impart moisture permeability, compounds in which oxygen is directly bonded to carbon, or water are preferred. In particular, any one of water, ethanol, and polyethylene glycol is preferred.

The hydroxyl group equivalent in the active hydrogen group-containing compound according to the present invention is preferably no less than 0.1 m mol/g, since the volume of the active hydrogen group-containing compound which should be added increases as the hydroxyl group equivalent decreases, and thus the expansion ratio becomes less likely to be elevated. The hydroxyl group equivalent is more preferably no less than 0.5 m mol/g further in light of the reactivity.

In the present invention, for allowing a dehydrogenation reaction with the hydrosilyl group in the curing agent (A) having hydrosilyl groups to be readily executed, a carboxylic acid such as acetic acid or propionic acid may be also used.

Additionally, when the resin composition including the curing agent (A), the polymer (B) and the hydrosilylation catalyst (C) is used, a compound having both a hydroxyl group and a carbon-carbon double bond which can be hydrosilylated in combination in the molecule, such as ethylene glycol monoallyl ether, polyethylene glycol monoallyl ether, polypropylene glycol monoallyl ether, monoallyl ether of an ethylene glycol-propylene glycol copolymer, glycerin monoallyl ether, glycerin diallyl ether, pentaerythritol diallyl ether, or pentaerythritol triallyl ether may be also used in order to adjust the physical properties such as the degree of crosslinking, expansion formability, moisture permeability, etc.

When an active hydrogen compound having 2 or more hydroxyl groups, or a hydroxyl group and an alkenyl group in one molecule, such as polyethylene glycol or polyethylene glycol monoallyl ether is used as the foaming agent (D), a cross-linked structure is formed along with generation of a hydrogen gas, which results from a reaction of the hydrosilyl group in the curing agent (a) having hydrosilyl groups with the hydroxyl group in the active hydrogen compound included in the foaming agent (D). Accordingly, a care is required in blending as in the following since deterioration of foamability, and lowering of the mechanical strength of the foam may be caused.

In the present invention, when the active hydrogen group-containing compound having two or more hydroxyl groups, or a hydroxyl group and an alkenyl group in one molecule is used as the foaming agent (D), the ratio of the blend of the curing agent (a), the polymer (b) and the foaming agent (D) is not particularly limited, and may be selected ad libitum depending on the structure of each compound, the intended expansion ratio, and the intended physical properties. However, the proportion of x (number of moles of the hydrosilyl group in the curing agent (a)) with respect to the sum of y (number of moles of the alkenyl group in the polymer (b)) and z (number of moles of the hydroxyl group in the foaming agent (D)), i.e., the value of x/(y+z) is preferably 1/10 to 50/1, more preferably 1/5 to 30/1, and still more preferably 1/2 to 20/1. When the value of x/(y+z) is beyond 50/1, the crosslinking density may be lowered, and thus sufficient mechanical strength may not be achieved. In contrast, when the value of x/(y+z) is less than 1/10, sufficient expansion and curing may not be caused.

Furthermore, the ratio of y (number of moles of the alkenyl group of the polymer (b)) and z (number of moles of the hydroxyl group of the foaming agent (D)) is not particularly limited, and may be determined ad libitum depending on the intended expansion ratio, the intended physical properties, the skeleton of the curing agent (A), and the type of the foaming agent (D), but in general, the ratio y:z is preferably 100:1 to 1:100, and more preferably 10:1 to 1:20.

To the silicone based polymer foam, the foam and the molded product of the present invention may be further added as needed in the range not to deteriorate the object and the effects of the present invention, a filler, an antiaging agent, a radical inhibitor, an ultraviolet ray absorbing agent, an adhesion modifier, a fire retardant, a foam stabilizer such as a polydimethylsiloxane-polyalkyleneoxide based surfactant or an organic surfactant (polyethylene glycol alkylphenyl ether, etc.), an acidic or basic compound (an additive for regulating the reaction of the hydrosilyl group with the hydroxyl group: acid prevents the condensation reaction, while the base accelerates the same), a storage stability modifier, an antiozonant, a light stabilizer, a thickening agent, a plasticizer, a coupling agent, an antioxidant, a heat stabilizer, an agent for imparting electrical conductivity, an antistatic agent, a radiation blocker, a nucleating agent, a phosphorus peroxide decomposing agent, lubricant, a pigment, a metal inactivator, a physical property adjusting agent, and the like.

In addition, a surfactant may be also added for the purpose of improving foam stability of the silicone based polymer foam, the foam and the molded product, as well as compatibility of the resin composition including the curing agent (a), the polymer (b) and the hydrosilylation catalyst (C), and also the gas-containing resin composition and the foamable resin composition further including the foaming agent (D).

Although the type of the surfactant is not particularly limited, specific examples include alkylsulfuric acid salts such as sodium lauryl sulfate, polyoxyethylene alkyl ether sulfuric acid salts such as sodium polyoxyethylene lauryl ether sulfate, polyoxyethylene alkyl ether acetic acid salts, lauryltrimethyl ammonium chloride, alkoxypropyltrimethyl ammonium chloride, dialkyldimethyl ammonium chloride, benzalkonium chloride liquids, betaine alkyldimethyl aminoacetate, alkyldimethylamine oxide, alkylcarboxymethylhydroxyethyl imidazolinium betaine and alkylamidepropyl betaine, and nonionic surfactants such as glycerin fatty acid esters, propylene glycol fatty acid esters and sorbitan fatty acid esters, and the like.

Furthermore, to the resin composition including the curing agent (a), the polymer (b) and the hydrosilylation catalyst (C) may be added a storage stability modifier as needed for the purpose of improving the storage stability. As the storage stability modifier, common stabilizers known as a storage stabilizer of the curing agent (a) can be used as long as the intended object can be achieved. Preferable examples of such a storage stability modifier include e.g., compounds including an aliphatic unsaturated bond, organic phosphorus compounds, organic sulfur compounds, nitrogen-containing compounds, tin based compounds, organic peroxide, and the like. At least one selected from these groups can be used.

Specific examples include e.g., benzothiazole, thiazole, dimethyl maleate, dimethyl acetylene dicarboxylate, 2-pentene nitrile, 2,3-dichloropropene, quinoline, and the like. At least one selected from these groups can be used, but not limited thereto. Of these, thiazole, benzothiazole and dimethyl maleate are particularly preferred in light of well-balanced achievement of both pot life and rapid curability.

The amount of the storage stability modifier used can be selected almost arbitrarily as long as it can be dispersed almost homogeneously in the curing agent (a) and the polymer (b), but it is preferred to use in the range of $10^{-6}$ to $10^{-1}$ mol per mol of the SiH group in the curing agent (a). When the amount is less than $10^{-6}$ mol, the storage stability of the curing agent (A) cannot be sufficiently improved, while the amount exceeding $10^{-1}$ mol may lead to insufficient curability.

Even more, to the silicone based polymer foam, the foam or the molded product of the present invention may be added a cell regulator if necessary. The type of the cell regulator is not particularly limited, and for example, inorganic solid powders such as talc, calcium carbonate, magnesium oxide, titanium oxide, zinc oxide, carbon black and silica, silicone oil based compounds such as polyether modified silicone oil, fluorine based compounds, and the like which have been commonly used may be exemplified. At least one selected from these groups can be used. The amount of the cell regulator used may be any amount in general use. Specifically, provided that the total amount of the curing agent (A), the polymer (B) and the hydrosilylation catalyst (C) is defined to be 100 part by weight, the amount of the cell regulator is preferably 0.1 to 100 part by weight, and more preferably 0.5 to 50 part by weight.

The process for producing the silicone based polymer foam, the foam and the molded product in the present invention is not particularly limited, and a process including mixing the base resin with the foaming agent, followed by injecting the mixture into a mold form and permitting expansion may be generally employed. In addition, a heat treatment of the resulting foam, or a post treatment such as lamination of a foam comprising a different base resin may be carried out to obtain the silicone based polymer foam, the foam or the molded product of the present invention.

In the process for producing the silicone based polymer foam according to the present invention, after the component that constitutes the silicone based polymer is mixed with the foaming agent, the mixture is injected into a mold form, and then the expansion is permitted, in general. The component that constitutes the silicone based polymer is preferably a resin composition including (a) a curing agent having at least two hydrosilyl groups in the molecular chain, (b) a polymer having at least one alkenyl group in the molecular chain and comprising a saturated hydrocarbon unit or an oxyalkylene unit as a repeating unit that constitutes the main chain, and (C) a hydrosilylation catalyst. The curing agent (A), the polymer (B), the hydrosilylation catalyst (C) and the foaming agent (D), and optional components such as a cell regulator are mixed while stirring to prepare a mixture liquid, whereby a foamable resin composition is provided.

It is more preferred that this foamable resin composition be injected into a mold form, and the curing is permitted to obtain a foam. It is more preferred that expansion is allowed before or concurrently with permitting curing of the resin composition, and process which includes: adding the foaming agent (D) having a liquid and/or solid state to the resin composition to prepare a foamable resin composition; and thereafter permitting expansion of the foamable resin composition concurrently with curing is preferred in light of the expansion formability and production efficiency.

In another preferred embodiment, it is preferred that the foaming agent (D) having a gaseous state be dispersed in a resin composition including the curing agent (a) having at least two hydrosilyl groups in the molecular chain, the polymer (b) having at least one alkenyl group in the molecular chain and comprising a saturated hydrocarbon unit or an oxyalkylene unit as a repeating unit that constitutes the main chain, and the hydrosilylation catalyst (C) to prepare a gas-containing resin composition, and thereafter injecting the gas-containing resin composition into a mold form, followed by curing. In yet another preferred embodiment, it is preferred that the foaming agent (D) having a liquid and/or solid state be added to a resin composition including the curing agent (a) having at least two hydrosilyl groups in the molecular chain, the polymer (b) having at least one alkenyl group in the molecular chain and comprising a saturated hydrocarbon unit or an oxyalkylene unit as a repeating unit that constitutes the main chain, and the hydrosilylation catalyst (C) to prepare a foamable resin composition, and thereafter permitting expansion of the foamable before or concurrently with permitting curing of the resin composition.

When a liquid or a solid is used as the foaming agent (D), the polymer (b) having at least one alkenyl group in the molecular chain and comprising a saturated hydrocarbon unit or an oxyalkylene unit as a repeating unit that constitutes the main chain, the hydrosilylation catalyst (C), the foaming agent (D) and the curing agent (a) having at least two hydrosilyl groups in the molecular chain, and other optional component as needed are mixed to prepare a foamable resin composition, and thereafter the mixture is injected into a mold form and heated, thereby permitting expansion before or concurrently with permitting curing to produce the silicone based polymer foam of the present invention.

When a gas is used as the foaming agent (D), the components that constitute the silicone based polymer, for example, the curing agent (a) having at least two hydrosilyl groups in the molecular chain, the polymer (b) having at least one alkenyl group in the molecular chain and comprising a saturated hydrocarbon unit or an oxyalkylene unit as a repeating unit that constitutes the main chain, the hydrosilylation catalyst (C), and the optional component such as a cell regulator as needed are mixed first while stirring to prepare a resin composition.

Subsequently, this resin composition is allowed to coexist in a sealed state together with the foaming agent (D) which is a gas, and thereafter compressed in the range of preferably about 0.001 to 50 MPa, and more preferably about 0.01 to 40 MPa. Thus compressed resin material is immediately transferred to a mixer, and stirred at a high speed. In this step, the gas is dispersed in the resin composition to yield a gas-containing resin composition. Next, the resin composition in which the gas is dispersed is compressed. After the compression, the resulting resin material is injected into a mold form by means of press fitting or the like, and heated to permit curing, thereby obtaining the silicone based polymer foam of the present invention. The compression conditions, and the heat conditions may vary depending on the expansion ratio or the viscosity; therefore, they are preferably adjusted ad libitum.

In light of foaming (amount of dispersed gas) and maintaining the bubbles after the foaming, for example, the viscosity of the resin composition before adding the foaming agent as measured with a B type viscometer at 4 rpm and at a room temperature (23° C.) is preferably 100 to 3,000 P (poise), and more preferably 300 to 1,500 P. When the viscosity is lower than 100 P, the foam may be broken to lead failure in obtaining a suitable foam, while the viscosity higher than 3,000 P may result in insufficient dispersion of the gas.

The silicone based polymer foam, the foam and the molded product of the present invention obtained as described in the foregoing have an ASKER FP hardness of preferably no greater than 50. The silicone based polymer foam of the present invention exhibits such softness.

The foam of the present invention is characterized by having a ratio $J_h/J_h^r$ of the creep compliance $J_h$ upon deformation to the creep compliance $J_h^r$ upon recovery being no less than 2. This suggests that recovery proceeds slower than deformation, and indicates that the foam is superior in following capability, pressure dispersibility, and the like.

The creep compliance will be explained in the following. The creep compliance J (t) [Pa$^{-1}$] is defined by the following formula (3) based on the constant stress $\sigma_0$ [Pa] applied to the sample, and the strain $\epsilon$ (t) determined by measurement.

$$J(t)=\epsilon(t)/\sigma_0 \tag{3}$$

Figure 2:
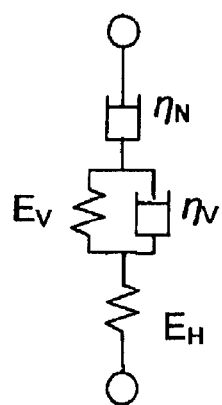
FIG. 2 shows a view illustrating a four-components viscoelastic model that corresponds to the creep curve.

Determination of J (t) is carried out using a dynamic viscoelastic measurement apparatus, such as for example, a rotary rheometer or a stress rheometer, while keeping the measurement temperature (25° C.) and the stress constant. When the strain $\epsilon$ is plotted versus time t [s] following initiation of applying the constant stress $\sigma_0$, a creep curve as shown in FIG. 1 is drawn. A four-element viscoelastic model that corresponds to this creep curve is shown in FIG. 2. This creep curve is analyzed for an instantaneous elastic part corresponding to instantaneous deformation, a viscoelastic part corresponding to retarded deformation, and a constant viscous part. It is regarded that the instantaneous deformation part can correspond approximately to a hook elastic model indicated by a spring; the retarded deformation part can correspond approximately to a Voigt viscoelastic material indicated by a spring and dashpot; and the constant viscous part can correspond approximately to a Newton viscous material model indicated by a dashpot. The equation is represented by the formula (4), whereby the viscoelastic coefficient is determined.

$$\epsilon/\sigma_0=J(t)=\epsilon_H/E_H+\epsilon_V/E_V(1-e^{-t/\tau})+t/\eta_N \tag{4}$$

Wherein, $E_H$ represents the modulus of elasticity of the hook elastic material; $E_V$ represents the modulus of elasticity of the Voigt viscoelastic material; $\tau$ represents the retarded time ($\tau$: $\eta_V/E_V$); $\eta_V$ represents the viscosity coefficient of the Voigt material; and $\eta_N$ represents the viscosity coefficient of the Newton material.

The compliance $J_H$ of the hook elastic material, i.e., the creep compliance $J_H$ in deformation can be represented by the following formula (5).

$$J_H=\epsilon_H/\sigma_0 \tag{5}$$

The instantaneous elastic part indicating the hook elastic material falls within the range of from initiation of applying the stress until reaching to a constant stress. The strain $\epsilon_H$ herein is represented by h$_1$ [m] shown in FIG. 1, and the original thickness H [mm] as the following formula (6).

$$\epsilon_h=h_1/H \tag{6}$$

After reaching to a constant stress, the retarded deformation part is exhibited, herein is recognized to follow the Voigt viscoelastic material. Thereafter, the Newton viscous material is exhibited in the constant viscous part that yields a linear relationship with respect to the time t.

On the other hand, recovery occurs via an instantaneous elastic recovery part until the stress falls down to zero, and the retarded elastic recovery part, in a similar manner also in recovery. In general, the compliance that corresponds to the recovered strain after a sufficient time elapsed following release of the stress is referred to as "equilibrium recovery compliance" J$^r$ (for example, see JP-A No. Hei 11-293073 and JP-A No. Hei 9-291117). However, the instantaneous elastic recovery part is characteristic according to the foam of the present invention; therefore, attention was focused on not the equilibrium recovery compliance but the instantaneous elastic recovery part, which was similarly defined to the instantaneous elastic part upon deformation. More specifically, an elastic linear relationship attained until the constant stress falls down to zero was defined as an instantaneous elastic recovery part. The creep compliance upon recovery in this range was designated as $J_h^r$, which is represented by the following formula (7).

$$J_h^r = \epsilon_h^r / \sigma_0 \tag{7}$$

The strain $\epsilon_h^r$ herein is represented by the following formula (8), which involves $h_1^r$ shown in FIG. 1, the point $h_3$ at which the stress was eliminated and the strain turned into recovery, and the original thickness H.

$$\epsilon_h^r = (h_3 - h_1^r)/H \tag{8}$$

It is known that the viscoelastic material which is closer to the ideals has the value of the instantaneous elastic part in deformation phase $h_1$ that is more approximate to the value of the instantaneous elastic recovery part in recovery phase $h_1^r$. Accordingly, such an ideal viscoelastic material has a ratio $J_h/J_h^r$ of the creep compliance $J_h$ upon deformation to the creep compliance $J_h^r$ upon recovery being 1. The ratio $J_h/J_h^r$ being greater than 1 indicates that recovery proceeds slower than deformation, while the ratio less than 1 indicates that recovery proceeds faster than deformation.

The foam of the present invention has the ratio $J_h/J_h^r$ of no less than 2, suggesting that recovery proceeds slower than deformation. Therefore, the foam is superior in the following capability and pressure dispersibility, has flexibility and exhibits favorable tactile impression. The ratio $J_h/J_h^r$ can be regulated to be no less than 2 by adjusting the cell structure in the foam such as the cell diameter, continuous cell rate, cell wall pore ratio, pore size, and cell shape such as anisotropy, as well as expansion rate, additives, and the like.

There are various types of ASKER hardness scales manufactured by Kobunshi Keiki Co., Ltd. to meet the hardness of the samples. ASKER C type or E type is recommended and used for samples of sponges and soft rubbers, while C2 type or F type is recommended and used for samples of soft plastic foams and foam rubbers (for example, see JP-A No. Hei 9-152787). Among these hardness scales, the ASKER FP type hardness scale can measure the softest sample. The foam of the present invention has a hardness of preferably no greater than 50 degrees, more preferably no greater than 30 degrees as measured with the ASKER FP type hardness scale. The less the hardness measured with the ASKER FP type hardness scale is, the more flexibility of the sample is suggested.

As the base resin of the foam of the present invention, thermosetting soft resins such as silicone based polymers, thermosetting polyurethane and melamine resins, thermoplastic soft resins such as soft vinyl chloride based resins, thermoplastic polyurethane and polyolefin, rubbers, and the like may be exemplified in light of the formability. Of these, silicone based polymers are preferred in light of safety.

As the silicone based polymer which can be used in the present invention, the silicone based polymer used for the silicone based polymer foam may be employed.

The shape of the foam in molding is not particularly limited, but a shape similar to that of the silicone based polymer foam according to the first aspect of the invention may be adopted, and those formed into the shape of for example, plate, sheet, irregular blocks, beads, or bag or garment may be exemplified. Further, the foam may be used alone, or may be used after integrally forming with a material such as an unfoamed plastic, a foam having a different expansion ratio, a film, a cloth, a nonwoven fabric, or paper.

In addition, a cloth formed of cotton, acryl fiber, wool, polyester fiber or the like, or a nonwoven fabric may be laminated appropriately on the surface of the foam of the present invention using an adhesive. By thus laminating in this manner, the tactile impression of the foam can be improved more favorably. Moreover, depending on the application thereof, a sweat absorbing action can be exerted by the laminated clothing fabric in exercise, as well as in sweating at a high temperature and humidity.

In an aspect, the present invention provides a molded product including foamed resin particles in a base resin consisting of a soft resin. Exemplary soft resin to be the base material may include thermosetting soft resins such as silicone based polymers, thermosetting polyurethane and melamine resins, thermoplastic soft resins such as soft vinyl chloride based resins, thermoplastic polyurethane and polyolefin, rubbers, and the like. Of these, the silicone based polymers are preferred in light of safety. In addition, a filler, a storage stabilizer, a plasticizer, a thickening agent and the like may be added to the base resin as needed in the range not to compromise the effect of the present invention.

The silicone based polymer which can be used in the present invention is not particularly limited as long as it is a resin obtained by curing a resin having a siloxane unit in the molecular skeleton, but to use, for example, a resin composition including a compound having hydrosilyl groups, a compound having an alkenyl group and a hydrosilylation catalyst is preferred in light of the formability and mechanical properties, as well as a good balance of various physical properties for use as a shock absorber. More preferably, as the compound having hydrosilyl groups, a resin composition including the curing agent (A), the compound (B) as the compound having an alkenyl group, and the hydrosilylation catalyst (C) is preferred.

Furthermore, it is more preferred that the silicone based polymer be comprising a resin composition which contains the curing agent (a), the polymer (b) and the hydrosilylation catalyst (C). In a more preferable embodiment, foamed resin particles are included in the foam-molded product comprising the resin composition in which the foaming agent (D) is further included.

The foamed resin particles in the present invention are not particularly limited, but they are preferably particles obtained by expanding a thermoplastic resin and/or a thermosetting resin. Exemplary thermoplastic resin which can be used for the foamed resin particles may include polystyrene, polyolefin, acrylic resins, polyesters, polyamide, thermoplastic elastomers, polyvinyl chloride, and the like. As the thermosetting resin which can be used for the foamed resin particles, polyurethane, phenol resins, epoxy resins, silicone based resins and the like may be exemplified, and at least one of these may be used. Of these, in light of enabling weight saving at a high expansion rate, and also in light of the miscibility with the soft resin typified by a silicone based resin, and the flow performance, formability and the like, foamed resin particles obtained by expanding at least one resin selected from polystyrene, polypropylene and polyethylene are preferably used.

The polystyrene is not particularly limited, and examples thereof include styrene homopolymers obtained by only a styrene monomer, random, block or graft copolymers obtained from a styrene monomer and a monomer that is copolymerizable with styrene, or a derivative thereof, modified polystyrene such as post-brominated polystyrene and rubber-reinforced polystyrene, ABS resins, and the like. These may be used alone, or two or more of these may be used as a mixture.

Examples of the monomer that is copolymerizable with styrene include styrene derivatives such as methylstyrene, dimethylstyrene, ethylstyrene, diethylstyrene, isopropylstyrene, bromostyrene, dibromostyrene, tribromostyrene, chlorostyrene, dichlorostyrene and trichlorostyrene, polyfunctional vinyl compounds such as divinylbenzene, (meth)acrylic compounds such as acrylic acid, methacrylic acid, methyl acrylate, methyl methacrylate, ethyl acrylate, ethyl methacrylate and acrylonitrile, diene based compounds such as butadiene or derivatives thereof, unsaturated carboxylic acid anhydrides such as maleic anhydride and itaconic anhydride, and the like. These may be used alone, or two or more of these may be used as a mixture.

The polypropylene is not particularly limited, and examples thereof include propylene homopolymers obtained by only a propylene monomer, random, block or graft copolymers obtained from a propylene monomer and a monomer that is copolymerizable with propylene, or a derivative thereof, and the like. These may be used alone, or two or more of these may be used as a mixture.

Specific examples of the monomer that is copolymerizable with propylene include olefins, e.g., α-olefin monomers having 2 to 8 carbon atoms such as ethylene, butene, pentene, hexene, heptane and octane, and cyclic olefins such as norbornene based monomers, vinyl alcohol esters such as vinyl acetate, (meth)acrylic acid alkyl esters in which the alkyl group has 1 to 6 carbon atoms such as methyl methacrylate, ethyl acrylate and hexyl acrylate, as well as vinyl alcohol, methacrylic acid, vinyl chloride, and the like. These may be used alone, or two or more of these may be used in combination.

Specific examples of the polypropylene include ethylene-propylene random copolymers, ethylene-propylene-butene random ternary copolymers, polyethylene-polypropylene block copolymers, homopolypropylene, and the like.

The polyethylene is not particularly limited, and examples thereof include ethylene homopolymers obtained by only a ethylene monomer, random, block or graft copolymers obtained from a ethylene monomer and a monomer that is copolymerizable with ethylene, or a derivative thereof, and the like. These may be used alone, or two or more of these may be used as a mixture.

Specific examples of the monomer that is copolymerizable with ethylene include olefins, e.g., α-olefin monomers having 2 to 8 carbon atoms such as propylene, butene, pentene, hexene, heptane and octane, and cyclic olefins such as norbornene based monomers, vinyl alcohol esters such as vinyl acetate, (meth)acrylic acid alkyl esters in which the alkyl group has 1 to 6 carbon atoms such as methyl methacrylate, ethyl acrylate and hexyl acrylate, as well as vinyl alcohol, methacrylic acid, vinyl chloride, and the like. These may be used alone, or two or more of these may be used in combination.

Specific examples of the polyethylene include low density polyethylene, medium density polyethylene, high density polyethylene, linear low density polyethylene, ethylene-vinyl acetate copolymers, ethylene-methyl methacrylate copolymers, and the like.

The thermoplastic resin which may be used for the foamed resin particles may be in an uncrosslinked state in use, or may be in a crosslinked state by means of peroxide, radiation or the like.

The expansion ratio of the foamed resin particles of the present invention may be predetermined in the range not to impair the effect of the present invention, and is preferably 1.1 times to 200 times, more preferably 1.5 times to 150 times, and still more preferably 2 times to 100 times. The expansion ratio referred to herein is defined as a value derived by dividing the apparent volume measured with a graduated cylinder or the like by its weight. Moreover, the particle size of the foamed resin particles is preferably 0.01 to 100 mm, and more preferably, 0.05 to 50 mm.

The content of the foamed resin particles when they are included in the molded product according to the present invention may be predetermined in the range not to impair the effect of the present invention, and is preferably 1% by volume to 99% by volume, more preferably 5% by volume to 95% by volume, and still more preferably 10% by volume to 90% by volume in the molded product.

The process for producing the molded product of the present invention is not particularly limited, and for example, when a resin obtained by curing a resin composition including (A) a curing agent having at least 1.1 hydrosilyl groups on average in the molecular chain, (B) a compound having at least one alkenyl group on average in the molecular chain, and (C) a hydrosilylation catalyst is used as the soft resin, a process in which foamed resin particles separately obtained by a well-known technique are further included in a resin composition including the curing agent (A), the compound (B) and the hydrosilylation catalyst (C), followed by permitting curing is preferred in view of the formability. The method of curing described above may vary depending on the blend conditions, but for example, a method of injection into a mold form followed by accelerating curing by heating may be exemplified.

In addition, as the process for producing the molded product according to the present invention, for example, a process in which after foamed resin particles are added to a resin composition including the curing agent (a), the polymer (b) and the hydrosilylation catalyst (C), the foaming agent (D) is added thereto, and heating or reducing the pressure is carried out to permit expansion; a process in which after the foaming agent (D) is dispersed in a resin composition including the curing agent (a), the polymer (b) and the hydrosilylation catalyst (C), the foamed resin particles are mixed therewith, and curing is permitted; and a process in which after the foaming agent (D) is included in a resin composition including the curing agent (a), the polymer (b) and the hydrosilylation catalyst (C), foamed resin particles are mixed therewith, and expansion is permitted concurrently with curing are preferred in view of the expansion formability and production efficiency.

When a gas is used as the foaming agent (D) in the molded product of the present invention, a mixture liquid of the curing agent (a), the polymer (b), the hydrosilylation catalyst (C) and the optional components such as a cell regulator is mixed while stirring to prepare a resin composition. Subsequently, this resin material is allowed to coexist with the foaming agent (D) being a gas in a sealed state, and thereafter compressed in the range of about 0.001 to 50 MPa, and preferably about 0.01 to 40 MPa. Thus compressed resin material is immediately transferred to a mixer, and stirred at a high speed.

In this step, the gas is dispersed in the resin material. Next, the resin material including thus dispersed gas is compressed. The molded product of the present invention including the foamed resin particles in the foam comprising a silicone based polymer is obtained by charging the resin material obtained following the compression by means of press fitting or the like into a mold form which had been filled with foamed resin particles in a desired amount beforehand, followed by heating. The compression conditions, and the heat conditions may vary depending on the expansion ratio or the viscosity, they are preferably adjusted ad libitum.

Furthermore, when a liquid or solid is used as the foaming agent (D) in the present invention, the polymer (b), the hydrosilylation catalyst (C), the foaming agent (D), the foamed resin particles and other optional components as needed are added and mixed, thereafter the curing agent (a) is added thereto and mixed therewith, and the mixture is then injected into a mold form. Thus, by permitting curing concurrently with expansion, or after expansion, the molded product of the present invention is obtained.

The shape of the silicone based polymer foam, the foam and the molded product in molding is not particularly limited, but a shape similar to that of the silicone based polymer foam according to the first aspect of the invention may be adopted, and those formed into the shape of for example, plate, sheet, irregular blocks, beads, or bag or garment may be exemplified. Further, the foam may be used alone, or may be used after integrally forming with a material such as an unfoamed plastic, a foam having a different expansion ratio, a film, a cloth, a nonwoven fabric, or paper.

In addition, a cloth formed of cotton, acryl fiber, wool, polyester fiber or the like, or a nonwoven fabric may be laminated appropriately on the surface of the silicone based polymer foam, the foam and the molded product of the present invention using an adhesive. By thus laminating in this manner, the tactile impression of the foam can be improved more favorably. Moreover, depending on the application thereof, a sweat absorbing action can be exerted by the laminated clothing fabric in exercise, as well as in sweating at a high temperature and humidity.

The shape of the silicone based polymer foam, the foam and the molded product of the present inventions is not particularly limited, and polygons such as rectangle, regular tetragon, circular, oval and diamond, as well as a strip and a doughnut shape with the inside hollowed, or arbitrarily having irregular pattern on the surface, and the like may be exemplified. Furthermore, in order to impart the breathability, through-holes may be provided ad libitum. Although the size of the foam is not particularly limited, it is preferably 1 $cm^2$ to 1000 $cm^2$, and more preferably 50 $cm^2$ to 500 $cm^2$.

Since the silicone based polymer foam, the foam and the molded product of the present invention have flexibility and exhibit favorable tactile impression, they can be used in a variety of applications in which such physical properties can be efficaciously exerted. They can be suitably utilized as acoustic insulating materials, damping materials, cushion materials and the like in applications such as wheeled vehicles, bedclothes, furnitures, various equipments, building materials, packaging materials, medical materials, and the like.

The silicone based polymer foam, the foam and the molded product of the present invention, for example, in transportation equipment applications can be utilized in seats, child seats, head rests, arm rests, foot rests and headliners of automobiles, building site equipments, railway wheeled vehicles, boats and ships, aircrafts, etc.; saddles, rider cushions of bikes, bicycles, etc.; bed mats for custom cars; cushion materials such as cushions for camping vehicles as well as skin materials and skin backing materials, ceiling materials; core materials, skin materials and skin backing materials of handles, door trims, instrument panels, dash boards, door panels, pillars, console boxes, quarter trims, sun visors, flexible containers, front mirrors, harnesses, dust covers, etc.; damping sound absorption materials of floor cushions, etc.; buffering materials such as helmet inner linings, crush pads, center pillar garnishes, etc.; heat insulating materials of freezing cars, refrigerator truck, tank trailer cars, freezing container cars, etc.; heat insulating materials and sealing materials of air conditioners, car coolers, etc.; air sealing materials and waterproof materials for around radiators, dampers, etc.; buoyancy materials and FRP board core materials of boats and ships, etc.; safety foams, gaskets, air filters, oil filters for use in fuel tanks, various types of sealing materials, engine damping materials, energy absorbing bumpers, guard acoustic insulating materials, sponges for wheeled vehicle waxing, and the like.

In bed clothes, beds and bedding applications, cushion materials as well as skin materials and skin backing materials such as pillows, bed quilts, bottom mattresses, beds, mattresses, bed mats, bed pads, cushions, baby beds, neck pillows for babies, and the like may be exemplified.

In furniture applications, cushion materials as well as skin materials, skin backing materials and packing materials for chairs, legless chairs, floor cushions, sofas and various types of cushions such as sofa cushion, sheet cushions, etc., carpets and rags, mats, coverlets for kotatsu (Japanese traditional heating device), bed quilts and lavatory mats, and the like may be exemplified.

In various types of equipment applications, filters, sound absorption materials and heat insulating materials for electric and electronic equipments, air conditioners, air cleaning equipments, etc.; sound absorption materials and heat insulating materials of printers, around the engines of building equipments, farm machineries, etc., power generators, refrigerators, freezing chambers, electronic jars, microwave ovens, etc.; cleaning rollers of printers; high-ink absorbers; ink cartridge filters; sealing buffering materials for liquid crystals, electronic parts, etc.; robot skins, fluid tight and air tight sealing materials, acoustic insulating flooring materials, wiping materials for clean rooms, electrical conductive cushion materials, antistatic cushion materials, pressure sensing materials; dew condensation preventing materials for room coolers and the like may be exemplified.

In applications of various types of sponges for washing, cleaners for cleaning, cleaners for dish washing, cleaners for body washing, shoe polishing cleaners, cleaners for car washing, and the like may be exemplified.

In toiletry applications, absorbing materials and side gathers of diapers, sanitary napkins, etc., as well as various types of liquid filters, and the like may be exemplified.

In foot wear applications, skin materials, backings, inner soles of shoes, shoes sore preventing pads, various types of shoe pads, inner boots, slippers, slipper scores, sandals, sandal inner soles, and the like may be exemplified.

In cosmetic tool applications, puffs for cosmetic use, chips for coloring around eyes, and the like may be exemplified.

In various types of miscellaneous goods application, core materials, cushion materials as well as skin materials and skin backing materials for bath items such as bath pillows, puffs for massaging, mouse pads, arm rests for key boards, working bench mats, non-slip cushions, stationery products (pen grips, self-inking rubber stamp materials), mini pillows for desks, earplugs, cotton swabs, sheets for hot packs, sheets for cold packs, poultices, spectacle pads, swimming goggle pads, face protectors, wrist watch pads, ear pads for headphones, earphones, ice pillow covers, foldable pillows, etc., double-faced tape base materials, adsorption media for fragrances, inking pads, etc., pin supports for Japanese flora art, and the like may be exemplified.

In clothing material applications, pad materials for shoulders, brassieres, etc., liners of cold protection materials, heat insulating materials, and the like may be exemplified.

In sports applications, cushion materials, skin materials and skin backing materials of protectors for sports, mats for bouldering (climbing rocks with a height of 2 to 3 m, mini rock climbing), kick boards, cushion materials for high jump, landing mats for gymnastics and exercise, kids mats, etc., liners for ski boots, snow board boots, etc., and the like may be exemplified.

In toys and treats applications, cushion materials, stuffings, skin materials and skin backing materials of hand exercisers, healing goods, key holders, stuffed toys, mannequin (lay figure) bodies, balls, massage balls, etc., casting materials for profiling and model production of various types of the shapes of articles such as specially shaped objects including ornamentation adornments, monstrous beasts, etc., profiling materials of the shapes of articles in casting methods, materials for producing model samples from molds, materials for producing ornamentation adornments, special moldings of monstrous beasts, molded objects, and the like may be exemplified.

In construction material applications, heat insulating materials of roofs, ceilings, walls and floors, sound absorption materials of roofs, ceilings, walls and floors, covers for water piping, etc., core materials for door panels, sizing panels, metal sizing panels, etc., core materials of partition panels, core materials of tatami mats and sliding screens, heat insulating and warm keeping core materials of bath tub, etc., joint filling materials, sealing materials, sealant backup materials, glass joint filling materials, adhesives, system ceiling heat insulating panels, rooftop heat insulating water proof materials, acoustic effect room sound absorption materials, airtight heat insulating materials of freezing warehouses, airtight warehouses, etc., warm keeping and cold reserving materials, etc., for tanks and pipe fittings in plants, corner buffering materials for fence shock absorbing walls, and circuits, soils for raising of seedling and horticulture, materials for hydroponic cultivation, sealing materials for places to be free from contamination such as clean rooms, support rubbers for loading substances such as vending machines, damping materials for heavy load, buoy, and the like.

In various types of packaging material applications, packaging materials and buffering materials for precision mechanical equipments, packaging materials for fruits, protective packaging materials for fruits, packaging materials for food products such as liner sheets for fish trays, cushion pads for carriers, buffering members of transportation pallets, foams for sound absorption of packaging materials, and the like may be exemplified.

In medical and nursing care applications, the silicone based polymer foam, the foam and the molded product of the present invention can be also utilized as cell sheets for regenerative medicine, artificial skins, artificial bones, artificial cartilages, artificial organs, and other biocompatible materials, pads for exuded drug solutions, styptic pads, gas-liquid separation filters (filters for indwelling needles), patches, medical liquid absorbing tools, masks, compression pads, disposable products for surgical operation, electrode pads for low frequency therapy equipments, mattresses for preventing bed sores, cushions for postural change, cushions for wheelchairs, seating faces of wheelchairs, nursing care supplies such as shower chairs, pillows for bathing in nursing care, palm protectors for contracture, liners for plaster casts, taping, liners for artificial limb prosthesis and prosthetic legs, denture platforms, other dental items, shock absorbing pads, hip protectors, protectors for elbows and knees, materials for covering wounds, and the like.

In addition, the foam of the present invention can be suitably utilized particularly in substances to be in contact with bodies, or approximate substances to them. Specific examples thereof include, in transportation equipment applications seats, child seats, head rests, arm rests, foot rests and headliners of automobiles, building site equipments, railway wheeled vehicles, boats and ships, aircrafts, etc.; saddles, rider cushions of bikes, bicycles, etc.; bed mats for custom cars; cushion materials such as cushions for camping vehicles as well as skin materials and skin backing materials, ceiling materials; core materials, skin materials and skin backing materials of handles, door trims, instrument panels, dash boards, door panels, etc.; buffering materials such as helmet inner linings, etc.; sponges for wheeled vehicle waxing, and the like.

In bed clothes, beds and bedding applications, cushion materials as well as skin materials and skin backing materials such as pillows, bed quilts, bottom mattresses, beds, mattresses, bed mats, bed pads, cushions, baby beds, neck pillows for babies, and the like may be exemplified.

In furniture applications, cushion materials as well as skin materials and skin backing materials for chairs, legless chairs, floor cushions, sofas and various types of cushions such as sofa cushion, sheet cushions, etc., carpets and rags, mats, coverlets for kotatsu (Japanese traditional heating device), bed quilts and lavatory mats, and the like may be exemplified.

In various types of equipment applications, robot skins, and the like may be exemplified.

In applications of various types of sponges for washing, cleaners for cleaning, cleaners for dish washing, cleaners for body washing, shoe polishing cleaners, cleaners for car washing, and the like may be exemplified.

In toiletry applications, absorbing materials and side gathers of diapers, sanitary napkins, etc., as well as various types of liquid filters, and the like may be exemplified.

In foot wear applications, skin materials, backings, inner soles of shoes, shoes sore preventing pads, various types of shoe pads, inner boots, slippers, slipper scores, sandals, sandal inner soles, and the like may be exemplified.

In cosmetic tool applications, puffs for cosmetic use, chips for coloring around eyes, and the like may be exemplified.

In various types of miscellaneous goods application, core materials, cushion materials as well as skin materials and skin backing materials for bath items such as bath pillows, puffs for massaging, mouse pads, arm rests for key boards, stationery products (pen grips), mini pillows for desks, earplugs, cotton swabs, sheets for hot packs, sheets for cold packs, poultices, spectacle pads, swimming goggle pads, face protectors, wrist watch pads, ear pads for headphones, earphones, ice pillow covers, foldable pillows, etc., and the like may be exemplified.

In clothing material applications, pad materials for shoulders, brassieres, etc., liners and the like, and in sports applications, cushion materials, skin materials and skin backing materials of protectors for sports, mats for bouldering (climbing rocks with a height of 2 to 3 m, mini rock climbing), kick boards, cushion materials for high jump, landing mats for gymnastics and exercise, kids mats, etc., liners for ski boots, snow board boots, etc. and the like may be exemplified.

In toys and treats applications, cushion materials, stuffings, skin materials and skin backing materials of hand exercisers, healing goods, key holders, stuffed toys, mannequin (lay figure) bodies, balls, massage balls, etc., casting materials for profiling and model production of various types of the shapes of articles such as specially shaped objects including ornamentation adornments, monstrous beasts, etc., profiling materials of the shapes of articles in casting methods, materials for producing model samples from molds, materials for producing ornamentation adornments, special moldings of monstrous beasts, molded objects, and the like may be exemplified.

In medical and nursing care applications, the silicone based polymer foam, the foam and the molded product of the present invention can be also utilized as cell sheets for regenerative medicine, artificial skins, artificial bones, artificial cartilages, artificial organs, and other biocompatible materials, pads for exuded drug solutions, styptic pads, gas-liquid separation filters (filters for indwelling needles), patches, medical liquid absorbing tools, masks, compression pads, disposable products for surgical operation, electrode pads for low frequency therapy equipments, mattresses for preventing bed sores, cushions for postural change, cushions for wheelchairs, seating faces of wheelchairs, nursing care supplies such as shower chairs, pillows for bathing in nursing care, palm protectors for contracture, liners for plaster casts, taping, liners for artificial limb prosthesis and prosthetic legs, denture platforms, other dental items, shock absorbing pads, hip protectors, protectors for elbows and knees, materials for covering wounds, and the like.

In particular, the silicone based polymer foam, the foam and the molded product of the present invention are preferably used as a shock absorber, and more preferably a shock absorbing pad. For example, the shock absorber can be obtained using the molded product including the foamed resin particles in the base resin consisting of a soft resin as in the following.

For example, when a resin obtained by curing a resin composition including the curing agent (A) having at least 1.1 hydrosilyl groups on average in the molecular chain, the compound (B) having at least one alkenyl group on average in the molecular chain and the hydrosilylation catalyst (C) is used as a soft resin, a process in which foamed resin particles separately obtained by a well-known technique are further included in the resin composition which contains the curing agent (A), the compound (B) and the hydrosilylation catalyst (C), followed by permitting curing is preferred in view of the formability. The method of curing described above may vary depending on the blend conditions, but for example, a method of injection into a mold form followed by accelerating curing by heating may be exemplified.

The shock absorbing pad of the present invention can exert the effect by attaching to a garment so as to correspond to a predetermined site of the body. The reason therefore is that the foam comprising a silicone based polymer as a base resin is light weight and has flexibility, accompanied by almost no toxicity.

Although the process for producing the shock absorbing pad of the present invention is not particularly limited, for example it can be produced as in the following.

<Production of Shock Absorbing Pad>

Using the foam comprising the silicone based polymer as a base resin obtained as described above, a shock absorbing pad is obtained, for example, as in the following. First, the obtained foam may be used as a shock absorbing pad directly, after cutting away the surface skin formed in expansion molding, or after cutting out to have an appropriate shape. However, in the case of applications in which effective development of breathability is required, it is preferred to cut away the surface skin, to provide an opening at the surface skin, or to provide a through-hole.

The shock absorbing pad of the present invention is suitably used by attaching to a garment. The garment to which the shock absorbing pad is attached is not particularly limited, but a garment that covers a part or whole of the lower body is preferred, and examples thereof include trousers such as slacks, jeans, training underpants, Sabrina underpants, knicker bockers, half underpants, knee breeches and hot pants, bottoms as outerwears for wearing on the lower body such as skirts and Japanese ceremonial kilts, underpants such as shorts, trunks, boxer briefs and briefs, girdles, inner wears for lower bodies such as fundoshi (traditional Japanese men's underpants), garments worn on foots such as socks, tabi (Japanese socks), tights, leg warmers and leggins, garments that cover the whole body such as one-piece dresses, dresses, raincoats, overalls, costume suits and tights covering whole body, garments for protection such as aprons, cooking overall aprons, white lab coats and protectors for armoring, and the like. Of these, for the purpose of absorbing the impact at a site more likely to suffer a bone fracture, trousers or underpants are preferred, and underpants are particularly preferred.

The method of attaching the shock absorbing pad to the garment is also not particularly limited, but a method of stitching the pad in a quilted fashion to the clothing fabric may be illustrated so as not to cause dislocation of the pad by a shear force or the like applied during wearing or washing, and so as to improve fit to the body and to allow freedom for exercise. For this purpose, the pad may be fixed by sewing with thread. The pad herein may be provided to be in contact with the body, or may be provided via a clothing fabric. Alternatively, for example, a pocket is formed, and the pad may be attached in a detachable manner therein.

With respect to the position where the shock absorbing pad is attached to the garment, it is preferred that the pad be attached at arbitrary one or more site(s) corresponding to the front body, the flank part, the back body, and/or the hip around the lumbar. By attaching the shock absorbing pad at such a site, protection mainly of the femoral neck is enabled. Therefore, by wearing the garment to which a shock absorbing pad which comprises the foam comprising a silicone based polymer as a base resin is attached at a position to enable the greater trochanter part of the lateral portion of the femoral neck to be protected, the femoral fracture can be prevented.

Also, two or more kinds of the pad may be used in combination in one underpants, i.e.; one a shock absorbing pad composed using a thick foam, attaching importance to shock absorbing capacity provided at a position where the subcutaneous fat that primarily alleviates the impact received due to falling or the like is comparatively thin and thus strong impact may be given to the bone; and another, attaching importance to wearing performance at the hip and the like where the impact is likely to be given by falling on one's behind or the like although there exists primarily a shock absorption ability to some extent due to thick subcutaneous tissue. In addition, when needed in terms of the wearing performance and the like, the shock absorbing pad composed using the foam of the present invention comprising a silicone based polymer as a base resin may be used at a site where strong impact is given, while other pad may be further used at a site where the impact can be comparatively alleviated. As the other pad, for example, an urethane foam, a polyethylene foam, an acryl foam, a nonwoven fabric, a three-dimensional fabric, or the like may be employed.

Although the density of the shock absorbing pad is not particularly limited, the pad having a density as low as possible is suitably used in light of feel in wearing. However, extremely low density can lead to failure in providing sufficient shock absorbing capacity. In this respect, the density is preferably 30 kg/m$^3$ to 1000 kg/m$^3$, and more preferably 50 kg/m$^3$ to 800 kg/m$^3$.

In addition, the clothing fabric for use in the garment is not also limited particularly with respect to the material, knitting process and the like, and in order to improve, for example, the breathability and shock absorbing capacity, an irregularity may be provided on the surface of the clothing fabric. Accordingly, pile knitting, or a knit texture that allows an irregular pattern shape to emerge on the surface, or the like is preferred. Particularly, it was proven that the effects as described in the foregoing can be achieved by mounting such a clothing fabric at a site situated on the body side of the garment. Moreover, in order to efficiently alleviate the impact by bringing the pad into close contact with the body, a stretch material may be used around the pad.

EXAMPLES

Hereinafter, the present invention will be explained in more detail by way of Examples, but the present invention is not limited to these Examples. Measurements and evaluations in the Examples and Comparative Examples were carried out under the conditions according to the methods described below. Unless particularly stated, part and % in Examples and Comparative Examples are based on the weight.

<Hardness Measurement Method>

An ASKER FP type hardness scale (manufactured by Kobunshi Keiki Co., Ltd.) was placed tenderly on a sample, and the hardness of the sample was determined based on the indicated value. Since the indicated value can decrease over time depending on the properties of the sample, the value immediately after placing the hardness scale was read.

<Density Measurement Method>

The weight of the obtained sample was measured, and the measurement was divided by the volume of the mold form to derive the density. With respect to the case of defective molding (i.e., insufficient filling in the mold form), the density was derived from the volume determined by measuring the contour of the obtained sample.

<Resilience Evaluation>

The Resilience was determined in accordance with JIS K6400-3, and the resilient modulus was derived. For the determination of the Resilience, a method in which a steel ball (diameter: 16±0.5 mm, mass: 16±0.5 g) was dropped on the test piece without rotation was carried out. The height from which the steel ball was dropped was 500±0.5 mm, and the height of the rebound was measured at the highest position of the steel ball. From thus obtained measurement results, the resilient modulus was derived using the following formula (9).

$$R = (L-16)/500 \times 100 \tag{9}$$

(wherein, R represents the resilient modulus (%), and L represents the height of rebound in measurement (mm))

<Shock Absorption Property Evaluation A>

The evaluation on absorption of the falling impact was carried out simply by the following method. It has been reported, as a result of analysis by an experiment using human bodies, and simulation, the impact force due to falling reaches to approximately 10,000 N at most (Robinovitch S. N., Hayes W. C., McMahon T. A.: A prediction of femoral impact forces in falls on the hip. J Biomech Eng, 113: 366-374; 1991, etc.). Further, it has been reported that an acceleration of 200 G is yielded by falling on a tatami mat according to an experiment carried out using a dummy model (Kenji KOYAMA, Eiichi GENDA, Toshihiro TOYONAGA: Evaluation of Hip Protector using Dummy for Falling. Japanese Journal of Occupational Medicine and Traumatology, 49 (5): 451-455, 2001, etc.), and the acceleration received upon falling on a floor material which has been generally used in hospitals and the like is envisaged to be still greater. Accordingly, on the assumption that the acceleration resulting from the impact upon falling is 400 G, the extent of ability of damping by the shock absorbing pad was evaluated.

In the experimental method, free fall of a weight was allowed in a drop impact tester under a condition to yield 400 G upon impact in the state without a sample. The acceleration damping ratio by the sample was derived with the rate of shock absorption A, based on the formula (10):

$$\text{Rate of shock absorption} = \{(400-k)/400\} \times 100 \tag{10}$$

wherein, k represents the acceleration resulting from the impact in the presence of the sample.

<Shock Absorption Property Evaluation B>

Free fall of a heavy weight of 40 kg on a tatami mat was allowed in a drop-weight impact tester from a position of the height being 30 cm. The impact acceleration in the state without a sample was 300 G. The acceleration damping ratio by the sample was derived with the rate of shock absorption B, according to the formula (11):

$$\text{Rate of shock absorption} = \{(300-k)/300\} \times 100 \tag{11}$$

wherein, k represents acceleration resulting from the impact in the presence of the sample.

<Creep Compliance Measurement Method>

The instantaneous elasticity creep compliance upon deformation, and the instantaneous elasticity creep compliance upon recovery were derived by carrying out a creep test with a creep meter (RHENONERII CREEP METER RE2-33005 S, manufactured by Yamaden Co., Ltd.), and using thus obtained creep curve. In the measurement conditions, the plunger shape to be in contact was a cylinder having a diameter of 16 mm, with the load for measurement being 3 N. Thus, the applied constant stress was 14920 Pa. The measurement time period was 120 sec (deformation: 60 sec, and recovery: 60 sec).

<Determination Procedure of Creep Compliance>

With respect to the creep compliance $J_h$ upon deformation, a straight line is drawn from a point of deformation (h=0, t=0) to the area of deformation while keeping a linear relationship on the obtained creep curve, and a point $h_1$ is defined where the creep curve deviates from the straight line. The creep compliance $J_h$ upon deformation is determined from this point $h_1$ using the formula (4) and the formula (3). On the other hand, the creep compliance $J_h^r$ upon recovery is derived using the formula (6) and the formula (5) by drawing a straight line from a point at t=60 and $h_3$, where the strain turned into recovery by eliminating the stress from the deformation, to the area of recovery while keeping a linear relationship, with a point $h_1^r$ defined where the creep curve deviates from the straight line. $J_h/J_h^r$ was determined by dividing the derived creep compliance $J_h$ upon deformation by the creep compliance $J_h^r$ upon recovery.

<Evaluation of Tactile Impression>

In evaluation of the tactile impression, the sample was touched by 20 panelists in effect, and evaluation of the tactile impression was carried out. When the sample was pushed or rubbed, one which exhibited favorable tactile impression was evaluated as B, one exhibited neither favorable nor unfavorable favorable tactile impression was evaluated as C, and one which exhibited unfavorable tactile impression was evaluated as D. Herein, the phrase "exhibited favorable tactile impression" refers to a feel as if being enclosed during pushing since the sample is soft and leads to less rebound. On the other hand, unfavorable tactile impression refers to a feel that imparts resistance with strong rebound.

<Evaluation of Feel in Wearing>

In evaluation of feel in wearing, an underpants of a cotton clothing fabric provided with pockets, which have an opening on the upper side, formed on left and right flank parts of the underpants, i.e., inside the site that covers the femoral neck was produced. The shock absorbing pad was inserted into the pockets, and the underpants were worn by 20 panelists. The sensuous evaluation was made with respect to possible disturbance of daily movement, the presence or absence of discomfort, stuffiness and pleasantness or unpleasantness of the feel by wearing for 24 hours, and the results were summarized. The evaluation standards in this test were as in the following.

A: No discomfort, without unpleasantness even in wearing for a long time period;
B: No discomfort, but stuffiness caused, accompanied by unpleasantness in wearing for a long time period; and
C: With discomfort, leading to difficulty in wearing for a long time period.

<Compound Used>

In Examples and Comparative Examples, the compounds shown in Table 1 were used.

TABLE 1

| Sample name | Composition | Trade name | Number average molecular weight | Amount of functional group | Number of functional groups per molecule |
|---|---|---|---|---|---|
| Curing agent A-1 | Polymethylhydrogen-2-phenylpropylsiloxane | manufactured by Kaneka Corporation: CR-100 | 760 | Containing 7.9 mmol/g of hydrosilyl group | 6 (*) |
| Curing agent A-2 | Methyl hydrogen silicone oil | manufactured by Shin-Etsu Chemical Co.,; KF-99 | 2,400 | containing 16.6 mmol/g of hydrosilyl group | 40 (*) |
| Polymer B-1 | Trifunctional allyl group-ended oxypropylene based polymer | manufactured by Kaneka Corporation: Kaneka Silyl S810ALP | 20,000 | Containing 0.150 mmol/g of alkenyl group | 3 (**) |
| Polymer B-2 | Allyl group-ended oxypropylene based polymer | manufactured by Kaneka Corporation: Kaneka Silyl ACX009-A | 9,400 | Containing 0.219 mmol/g of alkenyl group | 2 (**) |
| Polymer B-3 | Allyl group-ended oxypropylene based polymer | manufactured by Kaneka Corporation: Kaneka Silyl ACX022 | 20,000 | Containing 0.100 mmol/g of alkenyl group | 2 (**) |
| Catalyst C-1 | Pt-1,3-divinyl-1,1,3,3-tetramethyldisiloxane complex (3% by weight xylene solution) | | | | |
| Catalyst C-2 | Pt-1,3-divinyl-1,1,3,3-tetramethyldisiloxane complex (3% by weight isopropanol solution) | manufactured by N.E. CHEMCAT Corporation: PT-VTSC IPA3.0 | | | |
| Foaming agent D-1 | Highly purified air (nitrogen 79% + oxygen 21%) | | | | |
| Foaming agent D-2 | Ethanol | | | containing 21.7 mmol/g of OH | |

(*) hydrosilyl group,
(**) allyl group

Example 1

To 100 parts of the polymer B-3 were added 7.7 parts of the foaming agent D-2, and 0.03225 parts of the catalyst C-2, followed by intimate mixing. Further, to the mixture was added 12 parts of the curing agent A-2, followed by quick mixing. This mixture was injected into a 100-ml disposable cup, and curing was permitted by heating in an oven predetermined at 40° C. for 60 min to obtain a foam comprising a silicone based polymer as a base resin. Thus obtained foam had a density of 256 kg/m$^3$. In addition, the results of evaluation of the obtained foam are shown in Table 2.

Example 2

To 100 parts of the polymer B-3 were added 3.8 parts of the foaming agent D-2, and 0.03225 parts of the catalyst C-2, followed by intimate mixing. Further, to the mixture was added 12 parts of the curing agent A-2, followed by quick mixing. This mixture was injected into a 100-ml disposable cup, and curing was permitted by heating in an oven predetermined at 40° C. for 60 min to obtain a foam comprising a silicone based polymer as a base resin. Thus obtained foam had a density of 526 kg/m$^3$. In addition, the results of evaluation of the obtained foam are shown in Table 2.

TABLE 2

| | Example No. | | | |
|---|---|---|---|---|
| | Example 1 | Example 2 | Compar. Example 1 | Compar. Example 2 |
| Curing agent A/Compound B (molar proportion) | 1 | 1 | — | — |
| Surface area (cm$^2$) | 144.7 | 146.1 | 248.4 | 150.8 |
| ASKER FP hardness (degree) | 7.7 | 9 | 97.6 | 65.8 |
| Resilient modulus (%) | 8 | 8 | 9 | 3 |
| Evaluation of tactile impression | A | B | D | C |
| Rate of shock absorption A (%) | 46.4 | 51.5 | 44.5 | 84.7 |
| Rate of shock absorption B (%) | 14 | 17 | 15 | 15 |

Comparative Example 1

A polyurethane foam (trade name: Hip Protector, manufactured by Lyds International BV) having a thickness of 7 mm was evaluated in a similar manner to Example 1, and the results are shown in Table 2.

Comparative Example 2

Cushion Underpants

A polyurethane foam (trade name: cushion pants, manufactured by Tokyo Angel Corporation) having a thickness of 24 mm was evaluated in a similar manner to Example 1, and the results are shown in Table 2.

From the above results, it was revealed that as compared with Comparative Examples, the foams of Examples were superior in flexibility and exhibited favorable tactile impression.

Example 3

First, with 100 parts of the polymer B-1 was blended 25 parts of silica (trade name: NIP seal SS-50A, manufactured by Tosoh Corporation), and further 1 part of an antioxidant (trade name: IRGANOX 245, manufactured by Ciba Specialty Chemicals Corp.) was blended therewith, followed by mixing while stirring. Moreover, separately, 200 parts of calcium carbonate (manufactured by Maruo Calcium Co., Ltd., MC Coat S-20) and 1 part of the aforementioned antioxidant were blended with 100 parts of the polymer B-1, followed by mixing while stirring. Thus resultant mixtures were designated as mixture B-1a and mixture B-1b, respectively.

The polymer B-1 in an amount of 950 g, 1,000 g of the mixture B-1a, and 750 g of the mixture B-1b were mixed, and thereto were added 40.33 g of the curing agent A-1, a retardant dimethyl maleate (manufactured by Nacalai Tesque, Inc.) and 3-methyl-1-pentyne-3-ol (manufactured by Nissin Chemical Industry Co., Ltd., OLFINE P) in a volume of 29.78 µL and 403.93 µL, respectively. With the mixture was blended 900 µL of the catalyst C-1, and degassing under a reduced pressure gave a resin material.

Using a mechanical foaming machine with a setting of a pressure in charging the foaming agent being 0.41 MPa, a starch syrup-like resin composition was obtained by introducing the foaming agent D-1 into the resin material obtained as described above, and thereafter stirring at a high speed. This starch syrup-like resin composition was injected into a mold form having a rectangular shape with a thickness of 18 mm, a long side of 132 mm and a short side of 112 mm, and curing was permitted by heating in an oven predetermined at 140° C. for 30 min to obtain a shock absorbing pad composed of a foam comprising a silicone based polymer as a base resin. Thus obtained shock absorbing pad had a density of 206 kg/m$^3$. The results of evaluation of the obtained shock absorbing pad are shown in Table 3.

TABLE 3

| | Example No. | | |
|---|---|---|---|
| | Example 3 | Example 4 | Compar. Example 3 |
| Curing agent A/Compound B (molar proportion) | | | — |
| Surface area (cm$^2$) | 147.8 | 147.2 | 132.6 |
| ASKER FP hardness (degree) | 58.8 | 25.7 | 88.8 |
| Resilient modulus (%) | 46 | 13 | 13 |
| Rate of shock absorption A (%) | 60.2 | 54.4 | 69.1 |
| Rate of shock absorption B (%) | 13 | 15 | 18 |

Example 4

To 100 parts of the polymer B-2 were added 7.5 parts of the foaming agent D-2, and 0.08 parts of the catalyst C-2, followed by intimate mixing. Further, to the mixture was added 13 parts of the curing agent A-2, followed by quick mixing. This mixture was injected into an elliptic mold form having a thickness of 20 mm, a long axis of 165 mm and a short axis of 115 mm, and curing was permitted by heating in an oven predetermined at 40° C. for 60 min to obtain a foam comprising a silicone based polymer as a base resin, i.e., a shock absorbing pad. Thus obtained shock absorbing pad had a density of 171 kg/m$^3$. In addition, the results of evaluation of the obtained shock absorbing pad are shown in Table 2.

Comparative Example 3

A shock absorbing pad comprising a polyurethane foam, a polyethylene foam and a stainless coil (trade name: Hone Guard, manufactured by Naigai Co., Ltd., thickness of 7.2 mm) was evaluated in a similar manner to Example 3, and the results are shown in Table 3.

Example 5

An underpants of a cotton clothing fabric provided with pockets, which have an opening on the upper side and thus the shock absorbing pad can be inserted therein, formed on left and right flank parts of the underpants, i.e., inside the site that covers the femoral neck was produced. Accordingly, attaching the pad in a readily detachable manner is enabled. To these pockets was inserted the shock absorbing pad obtained in Example 3. The results are shown in Table 4. This underpants exhibited favorable feel in wearing, without discomfort even in constant wearing, and the part of the shock absorbing pad to be in contact with the skin exhibited a good feel.

TABLE 4

| | Example No. | | | |
|---|---|---|---|---|
| | Example 5 | Example 6 | Compar. Example 4 | Compar. Example 5 |
| Molded product used | Example 3 | Example 4 | Compar. Example 1 | Compar. Example 3 |
| Feel in wearing | A | A | B | C |

Example 6

An underpants was produced in a similar manner to Example 5 except that the shock absorbing pad inserted into the pocket was one obtained in Example 4, and the feel in use was evaluated. The results are shown in Table 4. This underpants exhibited favorable feel in wearing, without discomfort even in constant wearing, and the part of the pad to be in contact with the skin exhibited a good feel.

Comparative Example 4

An underpants was produced in a similar manner to Example 5 except that the shock absorbing pad inserted into the pocket was that of Comparative Example 1, and the feel in use was evaluated. The results are shown in Table 4. The shock absorbing pad in this underpants was a low-resilience material having a low resilient modulus, but had a low shock absorbing capacity, and was hard having a high hardness.

Comparative Example 5

An underpants was produced in a similar manner to Example 5 except that the shock absorbing pad inserted into the pocket was that of Comparative Example 3, and the feel in use was evaluated. The results are shown in Table 4. The shock absorbing pad in this underpants had a superior shock absorbing capacity, but was hard and exhibited unfavorable feel in wearing.

From the foregoing results, the shock absorbing pads of Examples exhibited more favorable feel in wearing as compared with Comparative Examples, and good balance of the shock absorbing capacity with the hardness and the feel in wearing was achieved, suggesting suitability as a shock absorbing pad.

$J_h/J_h^r$ of the samples of Example 2, Comparative Example 1, and Comparative Example 2 was determined. The results are shown in Table 5.

TABLE 5

| | Example No. | | |
|---|---|---|---|
| | Example 2 | Compar. Example 1 | Compar. Example 2 |
| $J_h/J_h^r$ (—) | 4.3 | 1.7 | 1.4 |
| ASKER FP hardness (degree) | 9 | 97.6 | 65.8 |
| Resilient modulus (%) | 8 | 9 | 3 |
| Evaluation of tactile impression | B | D | C |
| Rate of shock absorption A (%) | 51.5 | 44.5 | 84.7 |
| Rate of shock absorption B (%) | 17 | 15 | 15 |

From the results presented above, the foams of Examples had $J_h/J_h^r$ of no less than 2, revealing that they are more superior in flexibility, and exhibits more favorable tactile impression as compared with Comparative Examples.

Example 7

First, with 100 parts of the polymer B-1 was blended 25 parts of silica (trade name: NIP seal SS-50A, manufactured by Tosoh Corporation), and further 1 part of an antioxidant (trade name: IRGANOX 245, manufactured by Ciba Specialty Chemicals Corp.) was blended therewith, followed by mixing while stirring at a room temperature. Moreover, separately, 200 parts of calcium carbonate (manufactured by Maruo Calcium Co., Ltd., MC Coat S-20) and 1 part of the aforementioned antioxidant were blended with 100 parts of the polymer B-1, followed by mixing while stirring at a room temperature. Thus resultant mixtures were designated as mixture B-1a and mixture B-1b, respectively.

The polymer B-1 in an amount of 950 parts, 1,000 parts of the mixture B-1a, and 750 parts of the mixture B-1b were mixed, and thereto were added 40.33 parts of the curing agent A-1, the retardant dimethyl maleate (manufactured by Nacalai Tesque, Inc.) and 3-methyl-1-pentyne-3-ol (manufactured by Nissin Chemical Industry Co., Ltd., OLFINE P) in an amount of 0.03434 parts and 0.35142 parts, respectively. With the mixture was blended 0.774 parts of the catalyst C-1, and degassing under a reduced pressure gave a source material for a base resin constituted with a silicone based polymer.

With the source material for a base resin constituted with the silicone based polymer, were mixed 900 parts of foamed polypropylene resin particles (expansion ratio: 50 times), and a foamed resin particle-containing liquid resin composition was obtained by stirring at a room temperature. This liquid resin composition was injected into a mold form having a rectangular shape with a thickness of 18 mm, a long side of 132 mm and a short side of 112 mm, and curing was permitted by heating in an oven predetermined at 120° C. for 30 min to obtain a molded product including the foamed resin particles in the base resin constituted with a silicone based polymer. Thus resulting molded product had a density of 90 kg/m³.

Example 8

To 100 parts of the polymer B-2 was added 0.08 parts of the catalyst C-2, followed by intimate mixing. Further, to the mixture were added 20 parts of foamed polypropylene resin particles (expansion ratio: 50 times) and 13 parts of the curing agent A-2, followed by quick mixing. This mixture was injected into an elliptic mold form having a thickness of 20 mm, a long axis of 165 mm and a short axis of 115 mm, and curing was permitted by heating in an oven predetermined at 40° C. for 60 min to obtain a molded product including the foamed resin particles in the base resin constituted with a silicone based polymer. Thus resulting molded product had a density of 150 kg/m³.

Comparative Example 6

To 100 parts of the polymer B-2 was added 0.08 parts of the catalyst C-2, followed by intimate mixing. Further, to the mixture were added 20 parts of 5% by weight butane-containing foamable polystyrene resin particles and 13 parts of the curing agent A-2, followed by quick mixing. This mixture was injected into an elliptic mold form having a thickness of 20 mm, a long axis of 165 mm and a short axis of 115 mm, and curing was permitted by heating in an oven predetermined at 40° C. for 60 min. Thus resulting resin was not expanded to fill in the entire mold form, and had a density of 920 kg/m³.

As described above, contrary to defective molding observed in Comparative Examples, molded products that are superior in formability and of light weight could be obtained in Examples.

Example 9

To 100 parts of a compound B-2 (containing 0.08 parts of the catalyst C-2) was added 27.5 parts of the foaming agent D, followed by intimate mixing. Further, to the mixture were added 10 parts of foamed polypropylene resin particles (expansion ratio: 50 times, particle size: 7 mm) and 13 parts of the curing agent A-2, followed by quick mixing. This mixture was injected into an elliptic mold form having a thickness of 20 mm, a long axis of 165 mm and a short axis of 115 mm, and curing was permitted by heating in an oven predetermined at 40° C. for 60 min to obtain a foam-molded product including the foamed resin particles in the base resin constituted with a silicone based polymer, i.e., a shock absorber. Thus resulting foam-molded product had a density of 90 kg/m³. The evaluation results of the obtained foam-molded product are shown in Table 6.

Example 10

To 100 parts of a compound B-3 were added 27.7 parts of the foaming agent D and 0.03225 parts of the catalyst C-2, followed by intimate mixing. Further, to the mixture were added 10 parts of foamed polypropylene resin particles (expansion ratio: 50 times, particle size: 7 mm) and 12 parts of the curing agent A-2, followed by quick mixing. This mixture was injected into an elliptic mold form having a thickness of 20 mm, a long axis of 165 mm and a short axis of 115 mm, and curing was permitted by heating in an oven predetermined at 40° C. for 60 min to obtain a foam-molded product including the foamed resin particles in the base resin constituted with a silicone based polymer, i.e., a shock absorber. Thus resulting foam-molded product had a density of 140 kg/m$^3$. The evaluation results of the obtained foam-molded product are shown in Table 6.

TABLE 6

|  | Example No. | | | |
| --- | --- | --- | --- | --- |
|  | Example 9 | Example 10 | Compar. Example 7 | Compar. Example 2 |
| Curing agent A/ Compound B (molar proportion) | 0.5 | 1 | — | — |
| ASKER FP hardness (degree) | 20.5 | 15.2 | 97.6 | 65.8 |
| Resilient modulus (%) | 20 | 12 | 75 | 3 |
| Evaluation of tactile impression | B | A | D | C |
| Rate of shock absorption B (%) | 30 | 35 | 18 | 15 |

Comparative Example 7

To 100 parts of the polymer B-3 was added 0.08 parts of the catalyst C-2, followed by intimate mixing. Further, to the mixture were added 20 parts of 5 wt % butane-containing polystyrene resin particles and 13 parts of the curing agent A-2, followed by quick mixing. This mixture was injected into an elliptic mold form having a thickness of 20 mm, a long axis of 165 mm and a short axis of 115 mm, and curing was permitted by heating in an oven predetermined at 40° C. for 60 min. Thus resulting resin was not expanded to fill in the entire mold form, and had a density of 920 kg/m$^3$.

The results of Comparative Example 2 are also shown in Table 6 all together. From the foregoing results, it was revealed that the foam-molded products including the foamed resin particles in the base resin constituted with the silicone based polymer in Examples are light weight, and superior in the formability, flexibility, tactile impression, and shock absorbing capacity.

The invention claimed is:

1. A foam comprising a silicone based polymer as a base resin,
   wherein the ASKER FP hardness is no greater than 50.

2. The silicone based polymer foam according to claim 1 produced by curing a foamable resin composition comprising:
   (a) a curing agent having at least two hydrosilyl groups in the molecular chain;
   (b) a polymer having at least one alkenyl group in the molecular chain and comprising a saturated hydrocarbon unit or an oxyalkylene unit as a repeating unit that constitutes the main chain;
   (C) a hydrosilylation catalyst; and
   (D) a foaming agent.

3. The silicone based polymer foam according to claim 2, wherein the polymer (b) having at least one alkenyl group in the molecular chain and comprising a saturated hydrocarbon unit or an oxyalkylene unit as a repeating unit that constitutes the main chain is a linear polymer having a number average molecular weight of no lower than 10,000.

4. The silicone based polymer foam according to claim 2, wherein the polymer (b) having at least one alkenyl group in the molecular chain and comprising a saturated hydrocarbon unit or an oxyalkylene unit as a repeating unit that constitutes the main chain is a linear polymer having a number average molecular weight of no lower than 15,000.

5. The silicone based polymer foam according to claim 2, wherein the repeating unit that constitutes the main chain of the polymer (b) is an oxypropylene unit.

6. The silicone based polymer foam according to claim 2, wherein the molar ratio of the curing agent (a)/the polymer (b) (mol/ mol) is no less than 1/2.

7. The silicone based polymer foam according to claim 2 produced by dispersing the foaming agent (D) having a gaseous state in the resin composition to give a gas-containing resin composition, and thereafter injecting the gas-containing resin composition into a mold form to permit curing.

8. The silicone based polymer foam according to claim 2 produced by adding the foaming agent (D) having a liquid and/or solid state to the resin composition to give a foamable resin composition, and thereafter permitting expansion of the foamable resin composition before or concurrently with permitting curing.

9. The silicone based polymer foam according to claim 8, wherein the foaming agent (D) having a liquid and/or solid state is an active hydrogen group-containing compound.

10. A shock absorbing pad comprising the silicone based polymer foam according to claim 1.

11. A garment to which the shock absorbing pad according to claim 10 is attached at a site corresponding to at least one of the front body, the flank part, the back body and the hip around the lumbar.

12. The garment according to claim 11, wherein the shock absorbing pad is attached in a detachable manner.

13. The garment according to claim 11, wherein the garment is an underpants.

* * * * *

UNITED STATES PATENT AND TRADEMARK OFFICE
CERTIFICATE OF CORRECTION

PATENT NO. : 8,580,863 B2  Page 1 of 1
APPLICATION NO. : 12/532581
DATED : November 12, 2013
INVENTOR(S) : Shibaya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this
Twenty-second Day of September, 2015

Michelle K. Lee
*Director of the United States Patent and Trademark Office*